United States Patent [19]

Hobbs

[11] 4,136,507

[45] Jan. 30, 1979

[54] PEANUT COMBINE

[76] Inventor: Oliver K. Hobbs, P.O. Box 1306, Suffolk, Va. 23434

[21] Appl. No.: 396,806

[22] Filed: Sep. 13, 1973

[51] Int. Cl.$^2$ ............................................. A01D 41/10
[52] U.S. Cl. ...................................... 56/126; 56/16.6; 56/364; 130/30 C
[58] Field of Search ................. 130/27 P, 30 C, 30 E, 130/27 HF, 27 Z; 56/364, 14.6, 16.6, 16.5, 327, 126, 13.3, 13.4

[56] References Cited

U.S. PATENT DOCUMENTS

| | | | |
|---|---|---|---|
| 1,625,953 | 4/1927 | Lundquist | 130/27 P |
| 2,906,076 | 9/1959 | McCarty et al. | 56/364 |
| 2,974,467 | 3/1961 | Long | 130/30 C |
| 3,073,098 | 1/1963 | Farrar et al. | 56/16.5 |
| 3,381,455 | 5/1968 | Mitchell | 56/126 |
| 3,545,185 | 12/1970 | Whitfield et al. | 56/364 |
| 3,597,905 | 8/1971 | Jarrell | 130/30 C |
| 3,766,725 | 10/1973 | Marsh | 56/364 |
| 3,846,964 | 1/1974 | Frushour et al. | 56/126 |

Primary Examiner—Russell R. Kinsey
Attorney, Agent, or Firm—Stevens, Davis, Miller & Mosher

[57] ABSTRACT

A peanut combine is provided with an improved thrashing or picking system having longitudinally spaced thrashing cylinders rotating at different speeds in combination with vine flow control apparatus for directing the vines through the thrashing chamber and for intercepting the vines as they are moved by the cylinders to cause greater shredding of the vines and more efficient detachment of the peanuts from the vines.

29 Claims, 18 Drawing Figures

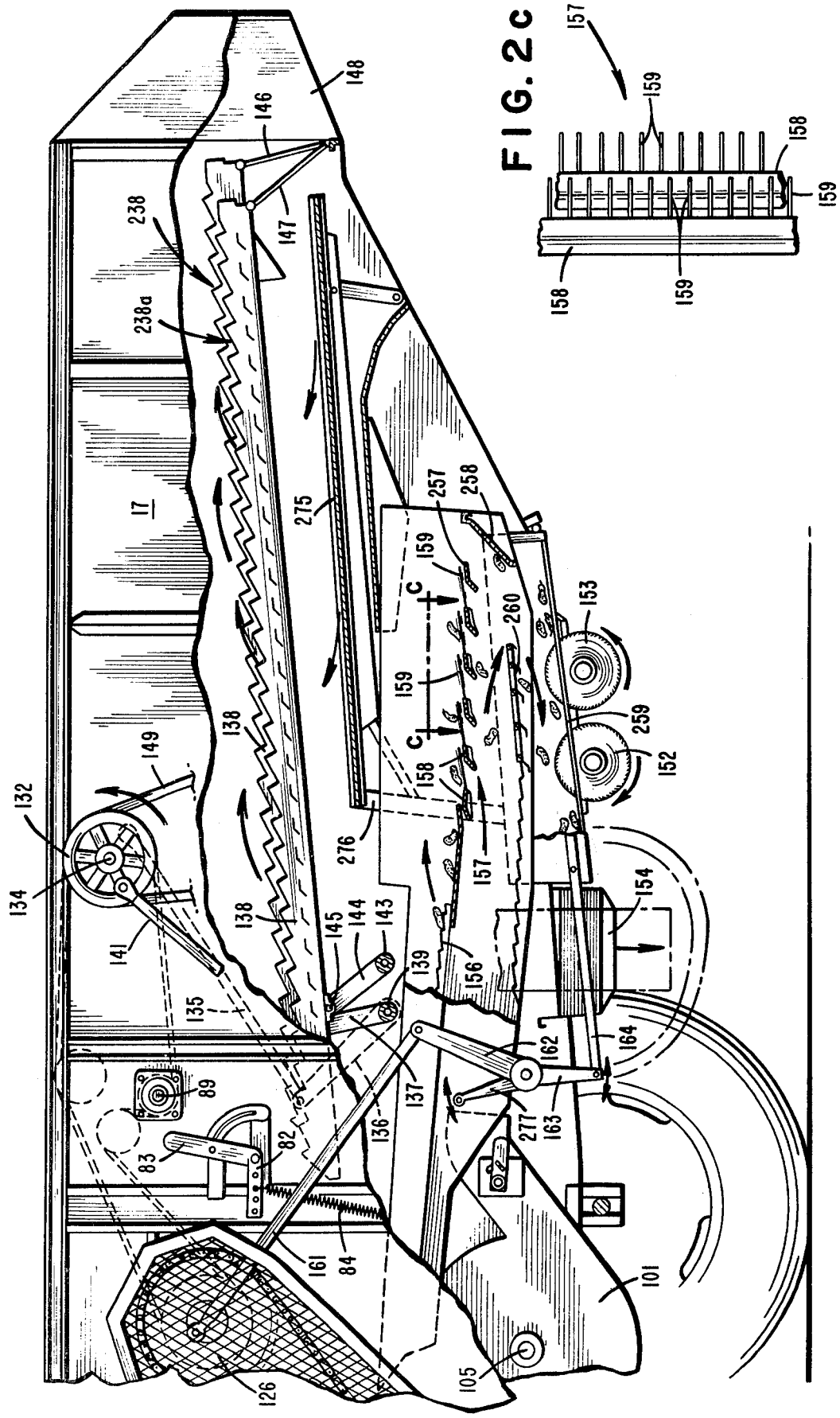

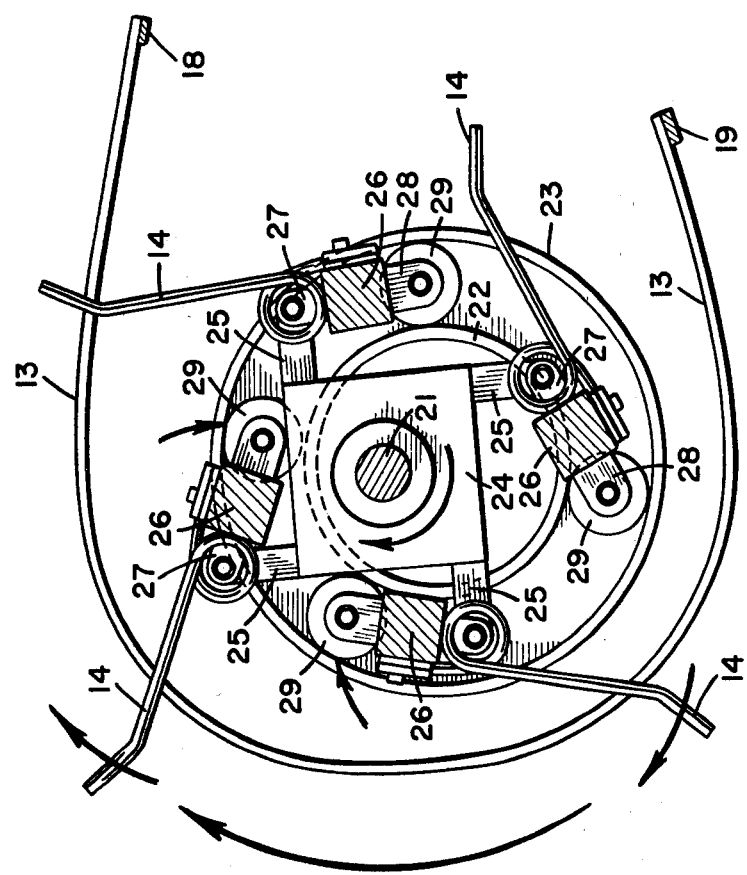
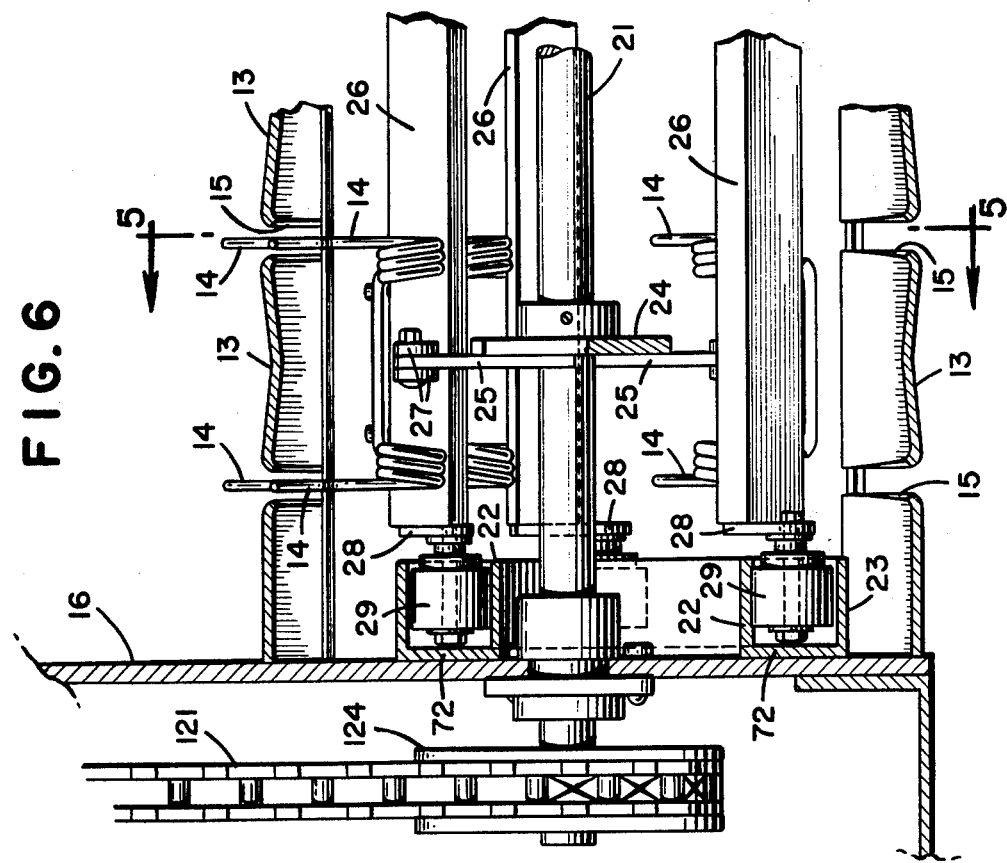

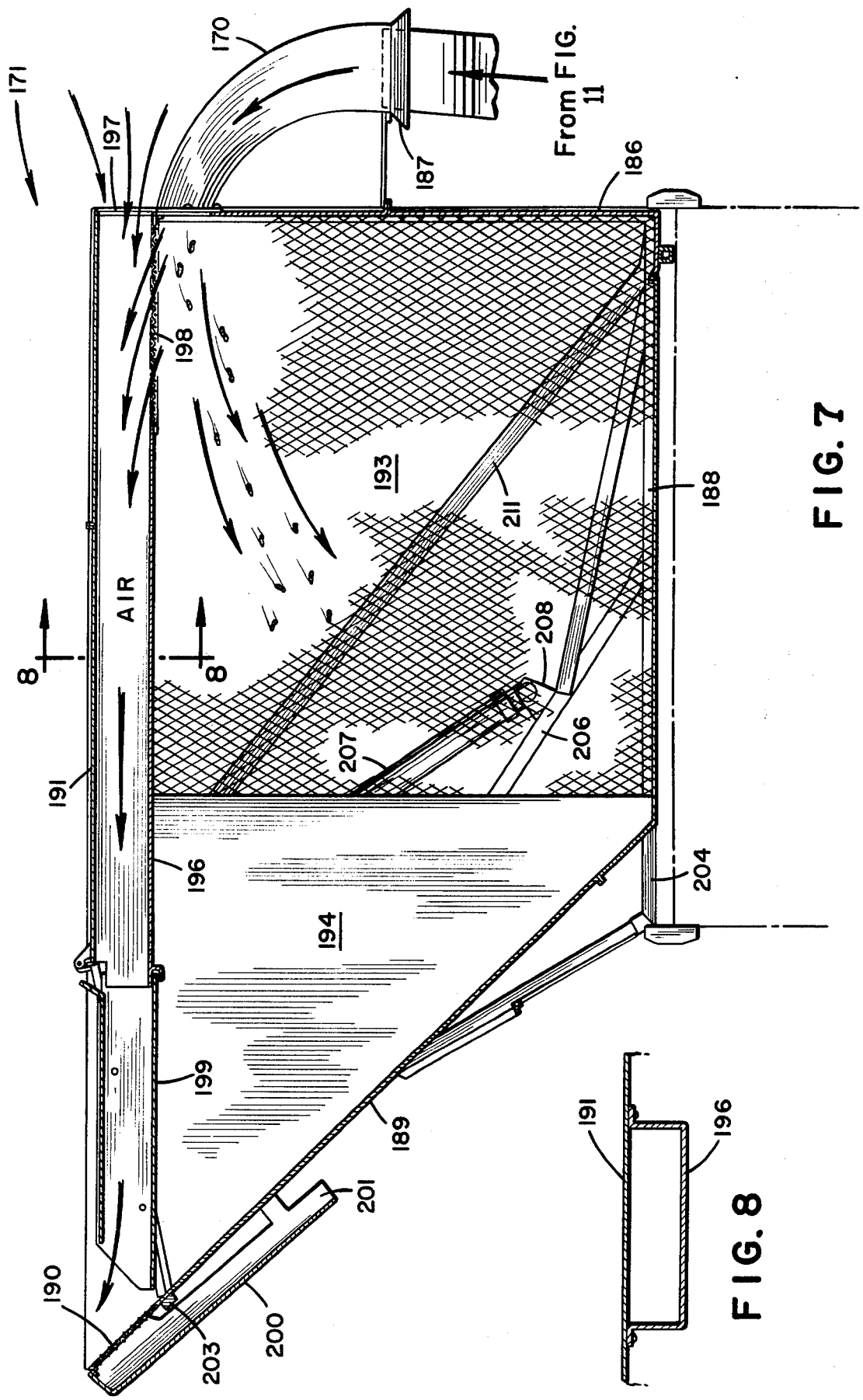

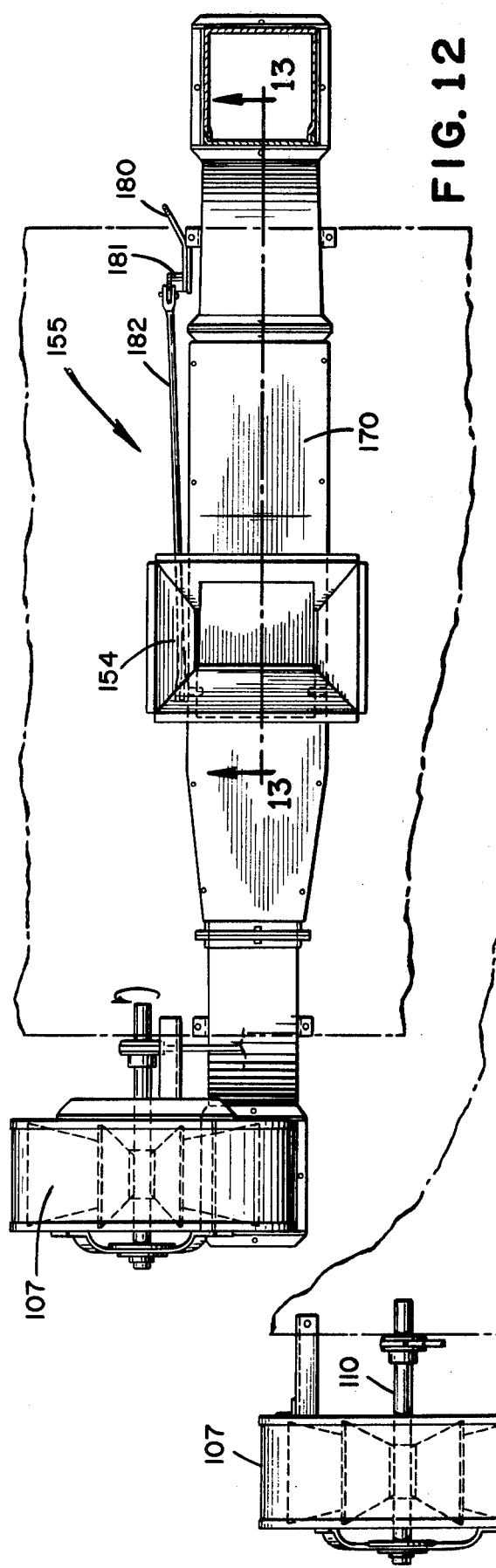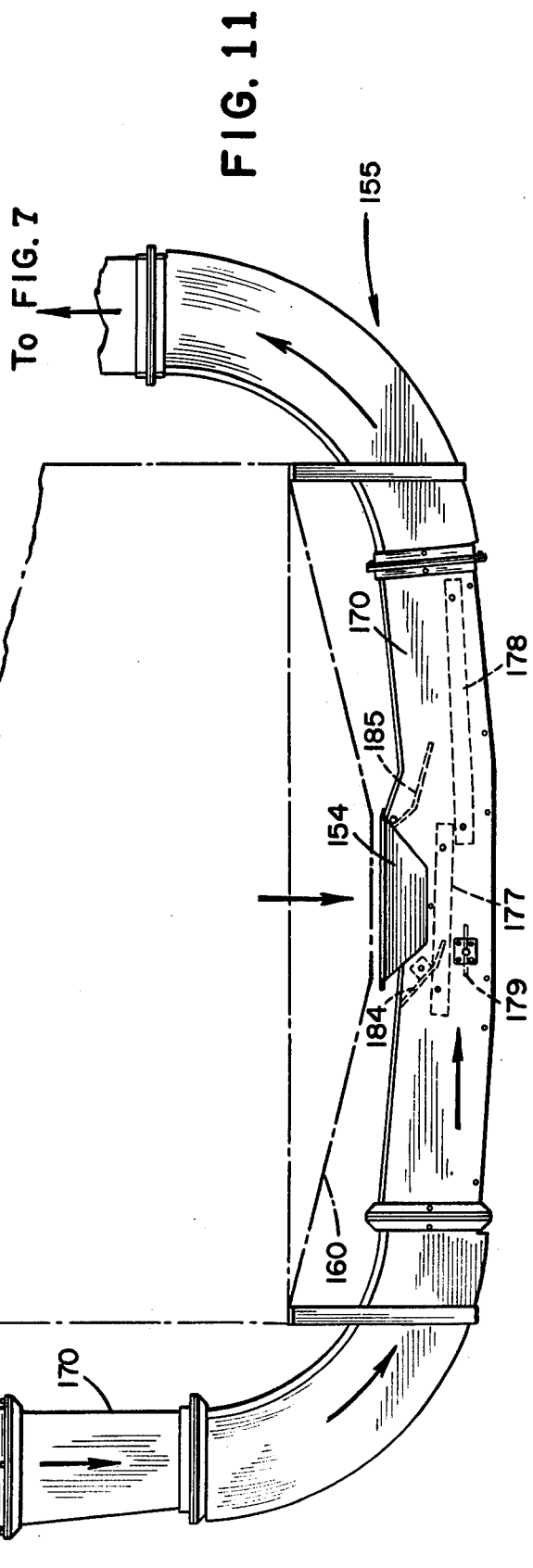

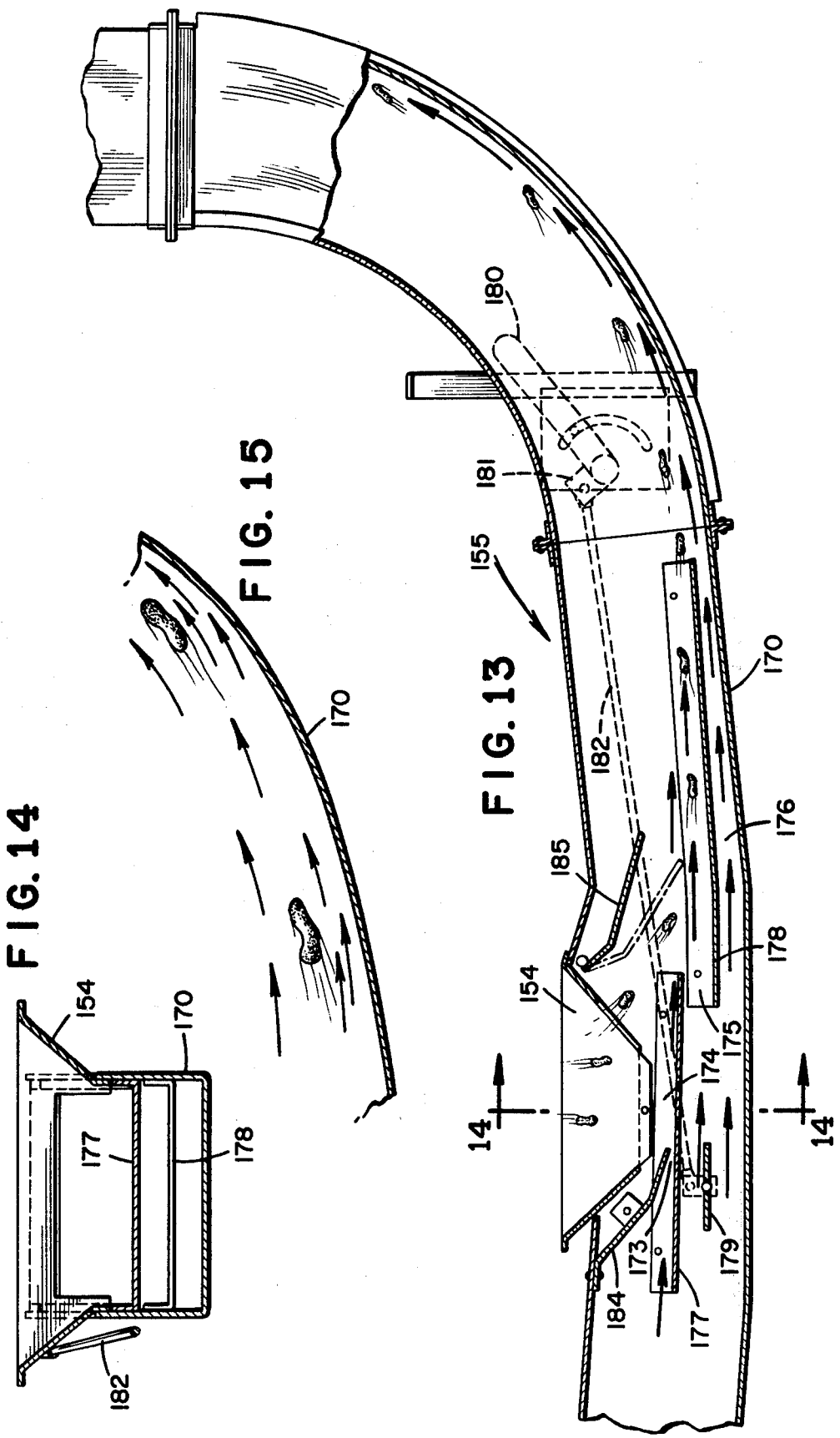

PEANUT COMBINE

This invention relates generally to a peanut combine and more particularly to an improved thrashing or picking system for such a combine.

Peanuts grow underground attached to the roots of vines which are above the ground. A peanut crop is harvested by digging peanut laden vines from the ground, shaking as much dirt as possible from the roots without detaching the peanuts and laying the peanuts on the ground in windrows to dry. One commercially successful digger-shaker apparatus is described and claimed in my U.S. Pat. No. 3,319,720. After some drying in the field, the vines are picked up from the windrow and thrashed by a combine to separate the peanuts from the vines. The conventional peanut combines have vine pick-up cylinders at the front thereof and a thrashing chamber provided with a plurality of thrashing cylinders which revolve and shred the vines to remove the peanuts therefrom. A screening system is provided for separating the peanuts from the vine fragments and a straw rack is provided for moving the vine fragments to the rear of the combine where they are discharged over the ground. The peanuts after separation from substantially all of the vine fragments are passed over a series of vibrating screens and stem cutters in the combine to clean them for bagging or other storage. The peanuts are discharged from the bottom of the combine after the stems have been removed and transferred to suitable bagging apparatus or to a bin carried by the combine.

As peanut laden vines are torn apart by resilient fingers carried by the revolving thrashing cylinders, a portion of the mass of vines and some peanuts will be carried around the cylinders and back towards the front of the thrashing chamber. Some of the vines and peanuts which have traversed the thrashing chamber to the rear end thereof will be carried by the thrashing cylinders over the top thereof back to the front of the chamber. While very few peanuts will remain attached to the vines as they are carried over the tops of the thrashing cylinders, a significant number of loose peanuts may become entrapped in the vine mass. Many of these loose peanuts fall from the heretofore available combines which have an opening in the housing provided for the vine pick-up cylinder and are lost. The heretofore available combines have the further disadvantage that vines and grass accumulate in their vine pick-up cylinder making it necessary to stop the combine and clean out the accumulation. This accumulation frequently occurs because bruised vines which are sticky from plant juices released during thrashing are permitted to fall on the stripper plates of the vine pick-up cylinder. The pick-up fingers become sticky and grass and other plants stick to the fingers and are carried through the spaces between the stripper plates instead of being released by the fingers above the stripper plates to be carried through the combine. Some of the available combines also injure the seed embryo flower of the peanut which renders it worthless for seeding a new crop.

It is an object of this invention to provide a peanut combine with an improved thrashing system which is adapted to shred the vines and to detach peanuts therefrom without damaging the peanuts to such an extent that they cannot be used for seeding purposes. Another object of the invention is to provide a peanut combine with thrashing cylinders and vine flow guides which effectively separate the peanuts from the vines without significant loss of peanuts at the front end of the combine. A further object of the invention is to provide a series of thrashing cylinders adapted to shred peanut vines and to detach peanuts therefrom with maximum shredding of the vines but without appreciable damage to the peanuts and at low power consumption levels. Still another object of the invention is to provide a peanut combine having increased thrashing capacity and adapted to adjust automatically to varying vine conditions and volume of load. Another object of the invention is to provide a peanut combine with a combination of an improved thrashing system and an improved conveying system for moving the peanuts discharged by the combine to an elevated position on the combine.

Other objects will become apparent from the following description with reference to the accompanying drawing wherein FIG. 1 is a front elevation of a preferred embodiment of a peanut combine provided with one embodiment of the pneumatic conveyor of the invention;

FIG. 2b is a side elevation, partially in longitudinal section, of the rear portion of the combine of FIG. 2a;

FIG. 2c is a fragmentary plan view taken along the line c—c of FIG. 2b;

FIG. 5 is a cross-section taken along the line 5—5 of FIG. 6;

FIG. 6 is a fragmentary section partially in elevation taken along the line 6—6 of FIG. 2a of the vine pick-up cylinder;

FIG. 7 is a cross-section taken through the storage bin of the peanut combine along the line 7—7 of FIG. 3;

FIG. 8 is a cross-section taken along the line 8—8 of FIG. 7;

FIG. 9 is a layout in plan view of the vine flow control apparatus taken along the line 9—9 of FIG. 2a;

FIG. 11 is a side elevation of a portion of the pneumatic conveyor shown on the combine in FIG. 1;

FIG. 12 is a plan view of the portion of the pneumatic conveyor illustrated in FIG. 11;

FIG. 13 is a longitudinal section taken between the lines 13—13 of FIG. 12;

FIG. 14 is a cross-section taken along the line 14—14 of FIG. 13; and

FIG. 15 is a diagrammatic illustration of peanuts being conveyed through a bend in the duct of the pneumatic conveyor of FIGS. 1, and 11 through 14.

Figure 1:
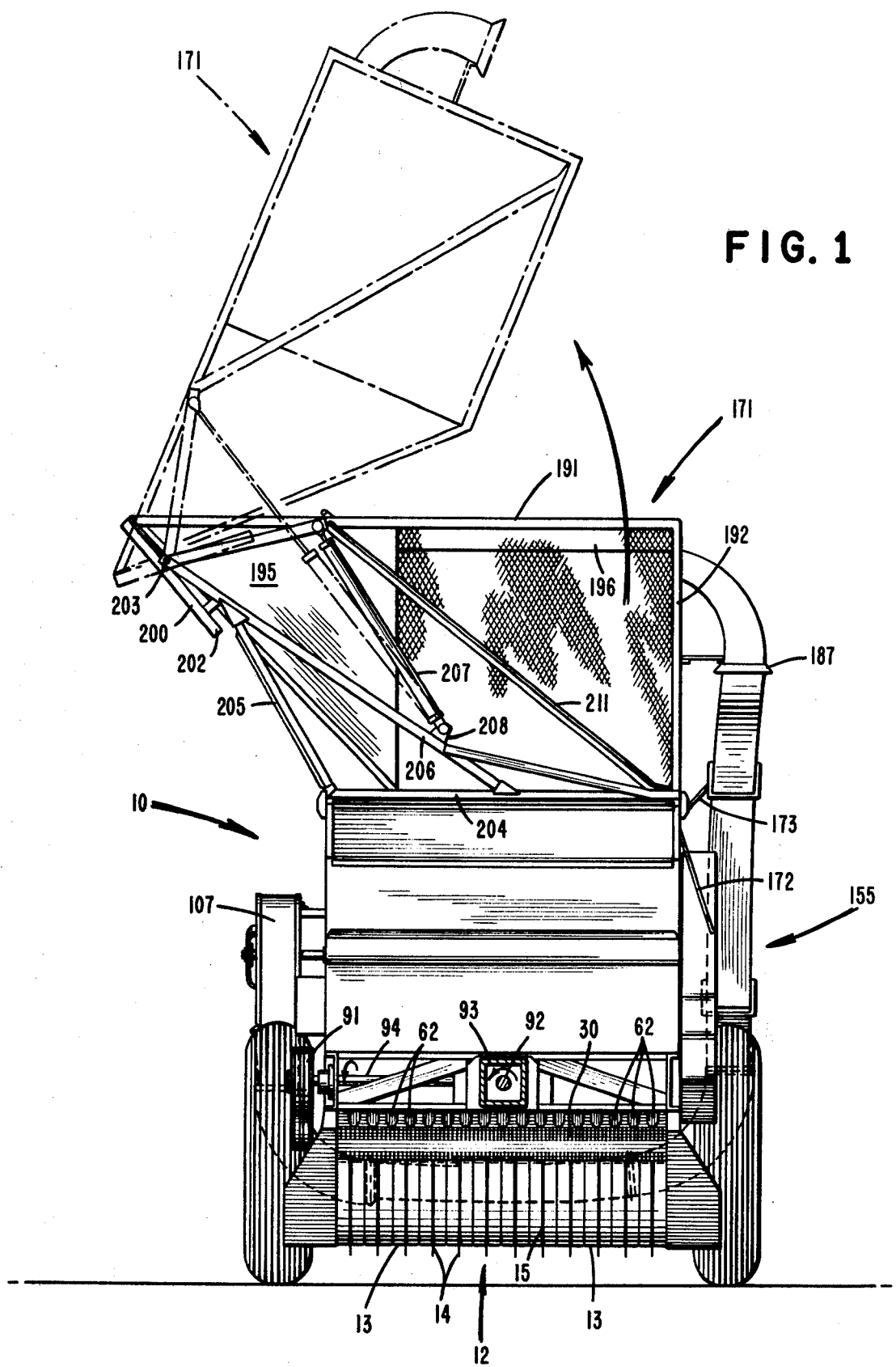

The foregoing objects and others are accomplished in accordance with this invention, generally speaking, by providing a peanut combine having a vine pick-up cylinder for lifting peanut laden vines from a windrow as it is towed thereover with a thrasher system having a series of three longitudinally spaced rotatable thrasher cylinders with the first two cylinders of the series disposed above screens which permit dirt and other material smaller than a peanut to pass therethrough and the third cylinder above a screen which will permit peanuts to pass therethrough and with a series of vine flow guides and intercepting means disposed about the thrashing cylinders which assists the thrasher cylinders in shredding the vines and detaching the peanuts therefrom. A first thrashing cylinder having an enclosed parallelpiped shaped vine carrier disposed about its shaft and carrying flexible spring fingers spaced radially outwardly of its vine carrier for moving the vine mass lifted by the pick-up cylinder into the thrashing chamber is disposed in the thrashing chamber immediately behind and above the pick-up cylinder. The second and third thrashing cylinders may be conventional open cylinders having circumferentially spaced transverse bars which define the periphery thereof and carry flexible spring fingers adapted to mesh with the fingers on the first drum to shred peanut vines passing through the thrashing chamber. The first thrashing cylinder may be larger in cross-section than the second and third thrashing cylinders. The second thrashing cylinder is rotated faster than the first cylinder and slower than the third thrashing cylinder. A plurality of stripper bars and cylinders are disposed above and between the thrashing cylinders to intercept the vine mass carried over the cylinders and with a vine control guide disposed in front of the first thrashing cylinder and above the vine pick-up cylinder which prevents peanuts from falling out of the combine through the opening provided for the vine pick-up cylinder. The combine is also provided with a straw rack for carrying vine fragments after they are separated from the peanuts to the rear of the combine where they drop outside of the combine housing and with a means responsive to the volume of vines carried over the third thrashing cylinder for varying the volume of straw deposited on the straw rack. A series of screens and plates are provided under the screen through which the peanuts fall from below the third thrasher cylinder for carrying the peanuts to a conventional series of disc-shaped saws which remove any stems remaining on the peanuts and for discharging the de-stemmed peanuts from the bottom of the combine.

The peanuts are discharged through a hopper and a discharge funnel into a pneumatic conveyor which transfers the peanuts without significant damage thereto from the bottom of the combine to a storage bin disposed above the combine's housing. The thrashing system provided by this invention may be used in combination with any suitable apparatus for discharging the vine fragments after the peanuts have been separated therefrom, any apparatus for de-stemming the peanuts and any means for collecting the peanuts discharged from the combine but it is preferably used on a combine provided with the pneumatic conveyor described and claimed in my copending application Ser. No. 396,807; filed on the same date as this application and entitled "Pneumatic Conveyor", the disclosure of that application being incorporated herein by reference thereto.

Figure 2A:
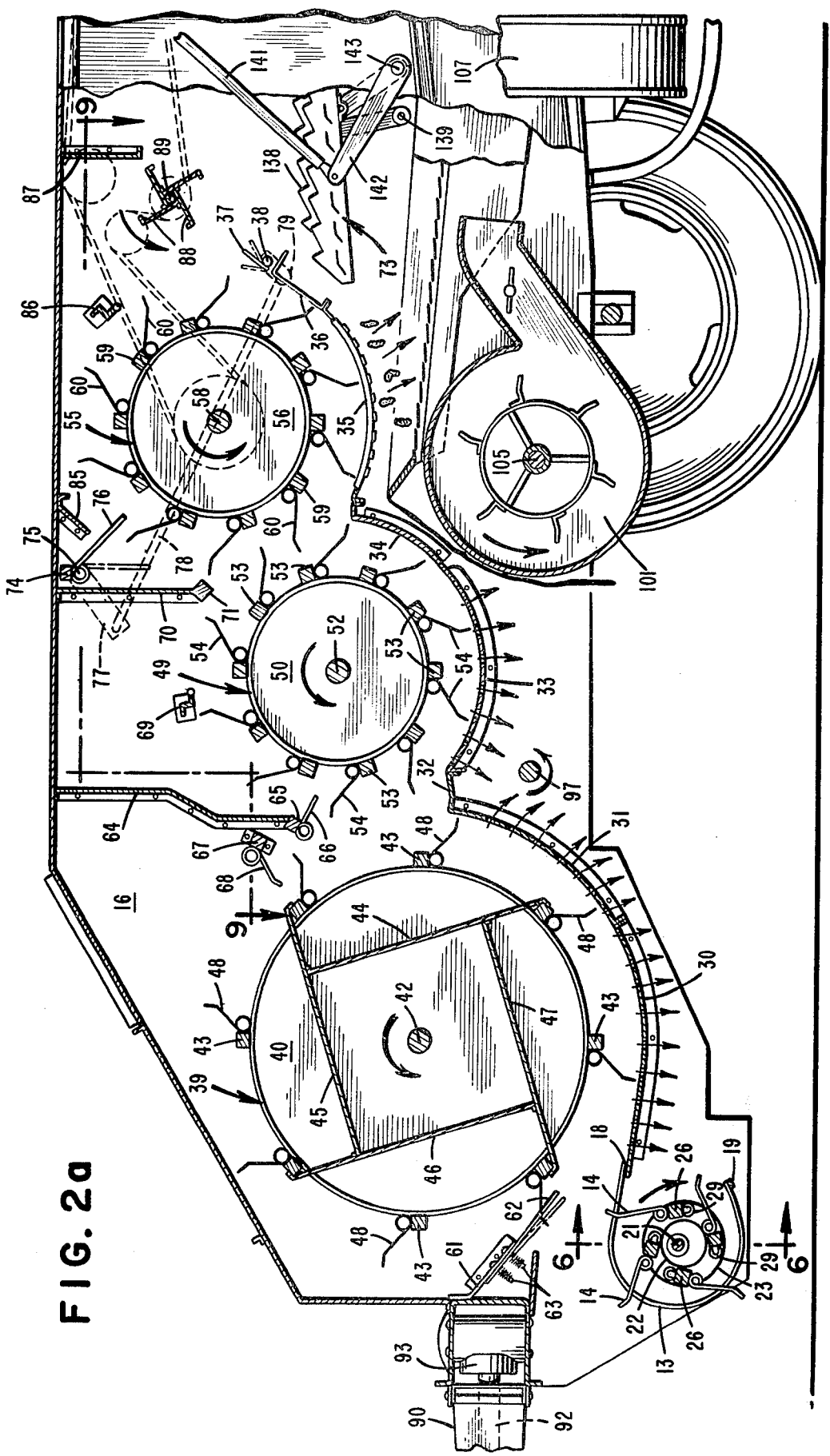
FIG. 2a is an enlarged longitudinal section through the thrashing section of the embodiment of FIG. 1.

Referring now to the drawing, a preferred embodiment of the thrashing or vine shredding section of the combine has a vine pick-up cylinder 12 disposed at the front of combine 10 to pick up peanut laden vines from a windrow and carry them into the thrashing section of the combine. Pick-up cylinder 12 has a plurality of curved laterally spaced stripper plates 13 which, as illustrated in FIGS. 1, 2a and 5 have a flat inclined top portion over which vines tend to flow by gravity into the thrashing section. A plurality of flexible spring fingers 14 (FIGS. 2a, 5 and 6) are rotated eccentrically through the spaces 15 between stripper plates 13 so they protrude outwardly from the plates 13 as they traverse the bottom and forward periphery of the plates 13 and are withdrawn to release the vines as they traverse the top portion and reach the downwardly inclined flat portion of the plates 13.

As illustrated in FIG. 5, vine pick-up cylinder 12 has its spaced stationary curved stripper plates 13 welded at their ends to bars 18 and 19. Bars 18 and 19 are fixed at their ends to sidewalls 16 and 17 of the combine housing 20. Stripper plates 13 are evenly spaced across the front opening in housing 20 with slots 15 therebetween. A shaft 21 is journaled at its ends in sidewalls 16 and 17 (FIGS. 2a and 6) and is within the space enclosed by stripper plates 13. A roller guide 72 having radially spaced concentric rims 22 and 23 is fixed to the inner-surface of wall 16 with rims 22 and 23 eccentrically about shaft 21 (FIG. 2a).

A square plate 24 (FIG. 5) is fixed to shaft 21 for rotation therewith in spaced relation with wall 16. A similar plate 24a (not shown) is inwardly spaced from wall 17 and fixed to shaft 21 for rotation therewith. Square plate 24 has an arm 25 fixed at each of its corners and projecting outwardly therefrom. As illustrated in FIG. 5, the arms 25 are so disposed that one arm 25 projects outwardly from each side of the square plate. Plate 24a carries similar arms 25a (not shown) at its corners and the arms 25 and 25a are aligned with each other. A cross-bar 26 is attached to each pair of oppositely disposed arms 25 and 25a and spans the distance therebetween. Each bar 26 extends beyond arms 25 and 25a into the space between square plate 24 and sidewall 16 (FIG. 6) and between square plate 24a and sidewall 17. An arm 27 is fixed at one end to bar 26 and is pivotally fixed at its other end to each of arms 25 while a similar arm 27a (not shown) is secured to bar 26 and is pivotally secured to the corresponding arm 25a carried by plate 24a. A bracket 28 is fixed to the side of bar 26 opposite the one which carries arm 27. A roller 29 is journaled on a shaft supported by bracket 28 and is disposed between rims 22 and 23 which act as a roller track for roller 29 as shaft 21 is rotated. Only one roller guide 72 is required so rollers and a track guide are not required adjacent to wall 17. Otherwise, the structure of the vine pick-up cylinder 12 adjacent to wall 17 is identical to the one adjacent to wall 16 illustrated in FIGS. 5 and 6. Of course, if desired, rollers can be provided about both ends of shaft 21 in which case the structure about shaft 21 is the same at each end of the vine pick-up cylinder.

Flexible spring fingers 14 are spaced along each bar 26 in alignment with the slots 15 between stripper plates 13. As illustrated in FIG. 5, rollers 29 and bars 26 will follow an eccentric path as shaft 21 rotates at an accelerated speed between about four o'clock and twelve o'clock as viewed in FIG. 5 and at a much slower speed from about twelve o'clock to four o'clock. Fingers 14 protrude through slot 15 to pick up vines from the ground under stripper plates 13 and carry the vines over to beyond the twelve o'clock position where they are withdrawn and release the vines on the upper flat portion of stripper plates 13.

Referring now to FIG. 2a, a pair of concave screens 30 and 31 are secured at their ends to the inner surfaces of sidewalls 16 and 17 and span the width of the thrashing chamber. Screens 30 and 31 are perforated to permit dirt to fall therethrough but the openings are too small for edible peanuts to pass. The front edge of screen 30 is secured to bar 18 and underlies the ends of the stripper plates 13. The rear edge of screen 30 abuts the front edge of screen 31. A slightly concave plate 32 is secured at its ends to the inner surfaces of walls 16 and 17 with one edge overlapping the rear edge of screen 31 and its rear edge abutting a screen 33. Concave screen 33 is also secured at its ends to sidewalls 16 and 17 and abuts at its rear edge a concave screen 34. The openings in screens 33 and 34 are too small to permit passage of peanuts therethrough. Screen 35 spans the chamber between walls 16 and 17 and is secured at its ends thereto. The perforations of screen 35 are sufficiently large to permit passage of peanuts therethrough. The rear edge of screen 34 and the front edge of screen 35 are bent so they are disposed in abutting relationship as shown in FIG. 2a with screen 35 disposed in a plane substantially perpendicular to screen 34. A panel 36 has a flange on its front edge which abuts the rear edge of screen 35 and a flanged rear edge. Panel 36 is secured at its edges to the inner surfaces of sidewalls 16 and 17 of the housing 20. A plate 37 (FIGS. 2a and 9) spans the thrashing chamber and is secured for rotation with shaft 38 journaled in sidewalls 16 and 17.

Figure 10:
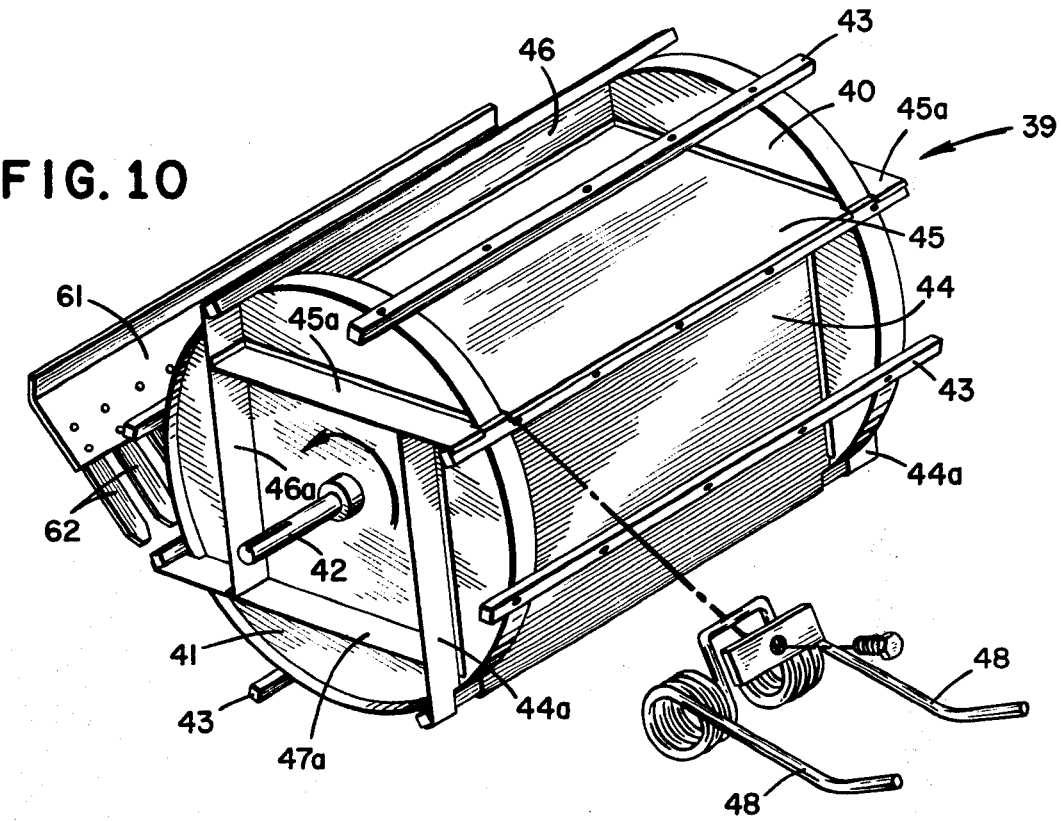
FIG. 10 is a perspective view of the first thrashing cylinder and the front vine flow guide control.

A first thrashing cylinder 39 spans the space between sidewalls 16 and 17 and has circular end plates 40 and 41 fixed to a shaft 42 and forming a pair of cylinder heads. (FIGS. 2a and 10). Shaft 42 is journaled in sidewalls 16 and 17 of housing 20. A plurality of bars 43 are circumferentially spaced around the peripheries of plates 40 and 41 with open spaces therebetween. The ends of bars 43 are welded or otherwise fixed to rims on plates 40 and 41. Rectangular plates 44, 45, 46 and 47 extend between circular plates 40 and 41 to form four flat walls enclosing shaft 42 to provide vine carrier surfaces. One end of each rectangular plate is bolted to a bar 43 and the other end is bolted or welded to a side of another plate to form a parallelpiped shaped portion around shaft 42. As illustrated in FIG. 2a, the cross-sectional dimensions of the space enclosed by plates 44, 45, 46 and 47 is less than the width of the plates 44, 45, 46 and 47 so one end of each plate is fixed to a side of an adjacent plate as shown in FIG. 2a. Plates 44a, 45a, 46a and 47a are provided at each end of cylinder 29 as extensions of plates 44, 45, 46 and 47 beyond end plates 40 and 41 (FIG. 10). Plates 44a, 45a, 46a and 47a are disposed between plates 40 and 41 and sidewalls 16 and 17 of the housing 20. Each bar 43 carries a plurality of flexible spring fingers 48 laterally spaced throughout the length of the bar (FIG. 10). Spring fingers 48 are spaced along the length of the bar 43 with each set of fingers 48 on one bar 43 staggered with respect to those on an adjacent bar 43 so that no set of fingers 48 on one bar 43 follows the path of a pair on an adjacent bar 43 as the cylinder 39 rotates.

Cylinder 39 is disposed above screens 30 and 31 which are substantially concentric therewith. The spacing between cylinder 39 and screens 30 and 31 is such that fingers 48 will contact peanut vines lying at the rear of stripper plates 13 and on screen 30 and 31 as cylinder 39 is rotated in a counterclockwise direction as viewed in FIG. 2a and move the vines from screens 30 and 31.

A second picking or thrashing cylinder 49 is disposed behind cylinder 39 with its longitudinal axis parallel to and above that of picking cylinder 39. Cylinder 49 is disposed above screens 33 and 34 which join to form an arc which is substantially concentric with the peripheral edge of cylinder 49. Cylinder 49 has a pair of identical circular end plates 50 and 51 (not shown) fixed to rotate with shaft 52. The ends of shaft 52 are journaled in sidewalls 16 and 17 of housing 20. A plurality of bars 53 are circumferentially spaced around the peripheries of plates 50 and 51, crossing the open space therebetween and secured at their ends to rims carried by plates 50 and 51. Each bar 53 carries flexible spring fingers 54 with the spring fingers 54 on one bar 53 being staggered along the length of the bar 53 (as illustrated on cylinder 39 in FIG. 10) to follow a different path from those of the immediately adjacent bars 53 as cylinder 49 is rotated. Cylinder 49 spans the thrashing chamber and is rotated at a speed which is faster than the rotation of cylinder 39. Cylinder 49 is smaller in cross-section than cylinder 39 and does not have its shaft 52 enclosed. Otherwise cylinder 49 is similar to cylinder 39 with open spaces between bars 53 and shaft 52 exposed. Thrashing cylinders 39 and 49 are spaced longitudinally in combine 10 so that fingers 54 will intercept vines carried by fingers 48 as cylinders 39 and 49 are rotated. This causes vines to be shredded and to be carried over screens 33 and 34. The spacing between thrashing cylinder 49 and screens 33 and 34 is such that fingers 54 are just above the screens as they pass thereover and will move vines lying on the screens as cylinder 49 is rotated.

A third thrashing or picking cylinder 55 has identical circular laterally spaced end plates 56 and 57 (not shown) fixed to a shaft 58 for rotation therewith. The ends of shaft 58 are journaled in sidewalls 16 and 17. Bars 59 are secured at one end to a rim on end plate 56 and at the opposite end to end plate 57 (not shown). Pairs of flexible spring fingers 60 are fixed along the length of bars 59 with the fingers 60 on one bar 59 being in staggered relationship with those on the adjacent bars 59. The configuration and dimensions of thrashing cylinder 55 are the same as those of cylinder 49. Thrashing cylinder 55 is rotated at a faster speed than cylinder 49.

The relative speeds of the three thrashing cylinders may be varied but it has been found that speeds of 36 RPM, 180 RPM and 225 RPM for cylinders 39, 49 and 55, respectively, produce good results.

Cylinder 55 is disposed in spaced relation above screen 35 which is substantially concentric with the periphery of end plates 56 and 57. The space between the periphery of cylinder 55 and screen 35 is such that fingers 60 are sufficiently close to screen 35 as they pass thereover upon rotation of cylinder 55 to move any vines accumulated on screen 35.

Figure 9:
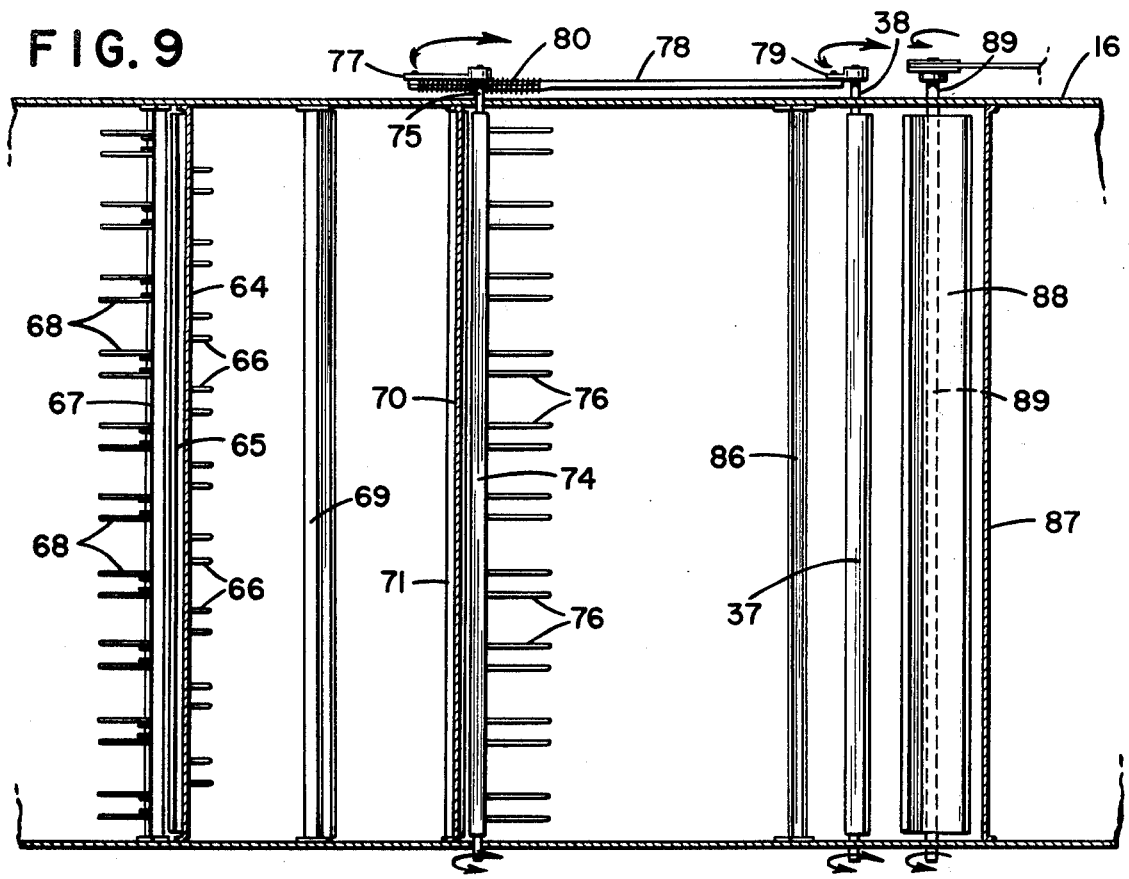

A vine feed control assembly is disposed above stripper plates 13 and in front of cylinder 39 (FIGS. 2a and 9). This feed control assembly has a bracket 61 extending transversely across the thrashing chamber and secured to the front wall of housing 20 and to sidewalls 16 and 17. Tooth-like plates 62 are fastened to bracket 61 by spring backed bolts 63 and are spaced across the width of the thrashing chamber as illustrated in FIG. 1. Spring fingers 48 pass through the slots between plates 62 as cylinder 39 is rotated.

A bent partitioning plate 64 (FIGS. 2a and 9) is suspended from the top of housing 20 and spans the width of the thrashing chamber above concave plate 32. Plate 64 extends from the top of housing 20 downwardly between the upper peripheries of cylinders 39 and 49. A strengthening bar 65 is provided across the lower edge of plate 64 and a plurality of spring fingers 66 are evenly spaced along the length of bar 65. Spring fingers 66 intercept vines carried by spring fingers 54 carried by cylinder 49. Plate 64 has a portion adjacent the top of the housing lying in a plane substantially perpendicular thereto, an intermediate portion which is inclined towards the front of the combine 10 and a perpendicular end portion depending from the inclined portion.

A stationary bar 67 is secured at its ends to sidewalls 16 and 17 and carries evenly laterally spaced spring fingers 68 which depend therefrom and intercept vines carried by fingers 48.

A stripper bar 69 is secured at its ends to sidewalls 16 and 17 and extends across the thrashing chamber above cylinder 50 to strip vines carried by fingers 54.

A partitioning plate 70 having a strengthening bar 71 attached to its lower edge is secured to the top of the housing and extends across the thrashing chamber between sidewalls 16 and 17 to which it is rigidly attached. Partitioning plate 70 is disposed over the rear pheripheral surface of cylinder 49 with bar 71 substantially within the rotational path of fingers 54 and fingers 60 carried by cylinder 55.

Figure 3:
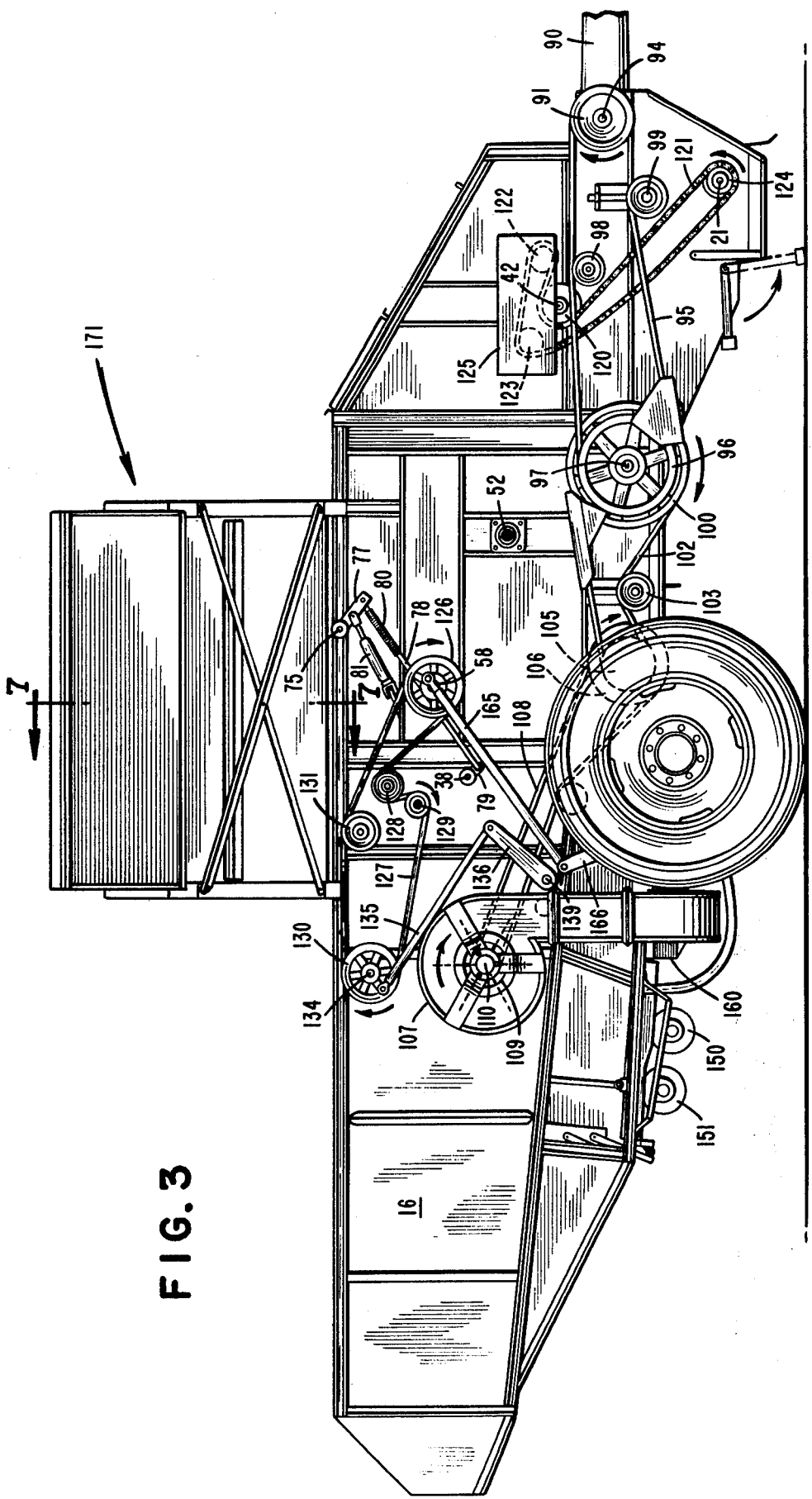
FIG. 3 is a side elevation of the combine of FIGS. 1 through 2b.

A vine load sensing member which opens and closes plate 37 to vary the amount of vine fragments falling on straw rack 73 is disposed adjacent to the rear side of partitioning member 70. This sensing member is supported on a bar 74. Stub shafts 75 and 75a are secured at each end of bar 74 to its bottom side. Bar 74 spans the thrashing chamber and shafts 75 and 75a are journaled in sidewalls 16 and 17. Flexible spring fingers 76 (FIGS. 2a and 10) are spaced evenly along the length of bar 74 and fixed thereto. The end of shaft 75 external of sidewall 16 is secured to a linkage member 77 (FIGS. 2a and 3). A connecting rod 78 is composed of two pieces with the upper piece pivotally secured in an opening in linkage member 77 and the lower piece pivotally secured to a crank arm 79 attached to shaft 38 which is journaled in sidewalls 16 and 17. The two pieces of connecting arm 78 are disposed side by side and housed in a spring 80 wrapped thereabout. Stops on the two rods confine spring 80 therebetween about connecting rod 78. The stops carried by the two pieces will not permit the length of connecting rod 78 to be less than a predetermined length so the minimum distance between the two connecting points is predetermined.

Panel 37 is secured to shaft 38 and extends across the thrashing chamber above the front end of straw rack 73. As illustrated in FIG. 3, a hydraulic cylinder 81 similar to a shock absorber used in the suspension system of an automobile is attached through its piston rod to linkage 77 to resist movement of linkage 77 towards the front of the combine from the position shown in FIGS. 2a and 3. An adjustment lever 82 and handle 83 (FIG. 4) are secured to shaft 38 and a spring 84 urges shaft 38 to a position where plate 37 is in the closed position shown by solid lines in FIG. 2a. The rotation of shaft 75, pivoting of linkage 77 and spring fingers 76 carried by bar 74 is controlled by hydraulic cylinder 81. When a rock or other object strikes sensing fingers 76 the fingers will flex and rotate shaft 75 and move linkage 77 forward of the position illustrated in FIG. 3. This flexing will be absorbed by spring 80 without moving plate 37. However, spring 80 is of sufficient strength to cause the extendable sections to normally remain hard against the stop except when wood, stones or other foreign objects pass through the machine. When a large volume of vines accumulate above cylinder 55, the sustained load on fingers 76 will cause connecting rod 78 to be moved forwardly and pull plate 37 to its open position illustrated in FIG. 2a by the front dotted lines and permit more vine fragments to fall on straw rack 73 and relieve the condition above cylinder 55.

Deflecting bar 85 is secured at one end to sidewall 16 and at the other end to sidewall 17 and extends across the thrashing chamber along the inside of the top wall of housing 20. Bar 85 deflects vines carried by cylinder 55 towards fingers 76.

A stripper bar 86 similar to bar 69 is disposed above the rear periphery of cylinder 55. Stripper bar 85 is fixed at its ends to sidewalls 16 and 17 and spans the thrasher chamber. Stripper bar 86 intercepts vines carried by fingers 60 which causes further shredding of the vines.

A panel 86 is secured at its ends to sidewalls 16 and 17 and extends downwardly from the top of the housing just behind and above a rotating stripping cylinder 88 to prevent flow of vines towards the rear of the combine. Stripping cylinder 88 has four vanes rigidly secured to a shaft 89 which is journaled at its ends in sidewalls 16 and 17 and moves vines accumulated in front of panel 87 back to fingers 60. Since the vanes rotate in a direction opposite to that of cylinder 55, further shredding of vines occurs.

While in operation, combine 10 is connected through tongue 90 to a tractor which tows it over peanut laden vines disposed in a windrow. Sheave 91 (FIG. 3) is rotated by power take-off shaft 92 (FIG. 2a) connected from the tractor through a universal joint 93 to shaft 94 journaled in sidewall 16. Pulley belt 95 is looped about sheave 91 and sheave 96 of a double pulley wheel fixed on shaft 97 for rotation therewith and to transfer power to the opposite side of the combine through shaft 97. Shaft 94, sheave 91, sheave 96 and shaft 97 rotate clockwise as viewed in FIG. 3. Belt 95 passes over take-up pulley wheels 98 and 99.

The second sheave 100 of the double pulley wheel fixed on shaft 97 for rotation therewith is used to transfer power to a straw fan 101 (FIG. 2a). Belt 102 passes over take-up pulley wheel 103 and is looped about sheave 100 and sheave 104 on shaft 105 which drives straw fan 101. The vanes of straw fan 101 are rotated counterclockwise as shown in FIG. 2a by shaft 105. Straw fan 101 is disposed within housing 20 and blows trash from the rear of the combine. Sheave 104 is one side of a double pulley wheel and the second sheave 106 fixed to shaft 105 is used to transfer power to a pneumatic conveyor fan 107. Belt 108 is looped above sheave 106 and about sheave 109 fixed to shaft 110 of conveyor fan 107. Fan 107 is rotated counterclockwise as viewed facing sidewall 16.

Figure 4:
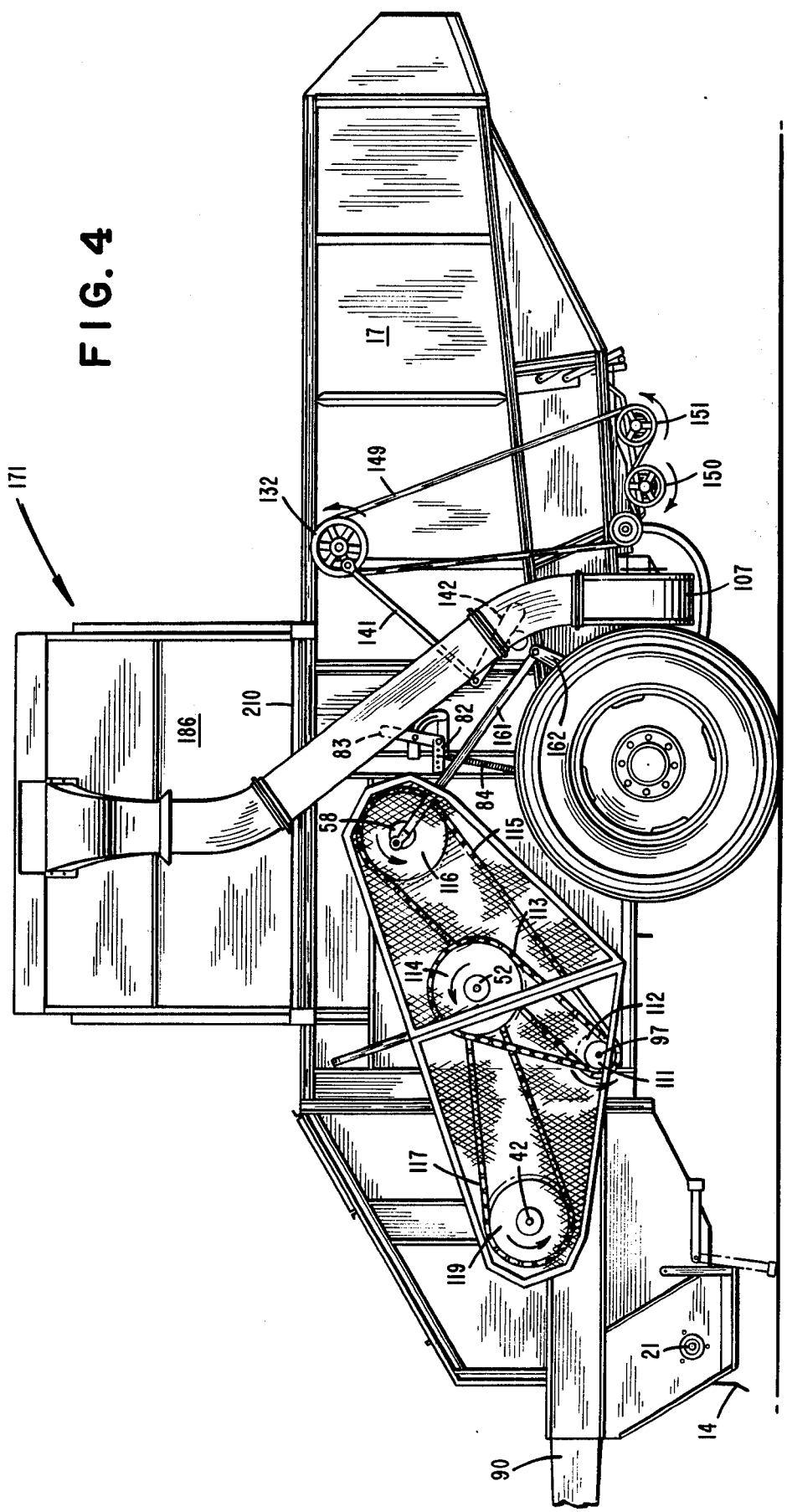
FIG. 4 is an elevational view of the side opposite to that of FIG. 3.

Power transfer shaft 97 has double sprocket wheels 111 and 112 fixed for rotation therewith external of sidewall 17 (FIG. 4). Sprocket chain 113 is looped about sprocket wheel 111 and sprocket wheel 114 fixed on shaft 52 for rotation therewith. The second thrashing cylinder 49 is rotated with shaft 52 counterclockwise as viewed in FIGS. 4 and 2a. Sprocket chain 115 is looped about sprocket wheels 112 and 116. Sprocket wheel 116 is fixed on shaft 58 for rotation therewith to rotate the rear thrashing cylinder 55 counterclockwise as viewed in FIGS. 4 and 2a. Sprocket chain 117 is looped about sprocket wheel 118 (not shown) fixed on shaft 52 to rotate therewith and about sprocket wheel 119 fixed on shaft 42 for rotation therewith. Thrashing cylinder 39 is rotated by shaft 42 counterclockwise as viewed in FIGS. 2a and 4.

A sprocket wheel 120 is fixed on the end of shaft 42 externally of sidewall 16 for rotation with shaft 42 (FIG. 3). Sprocket chain 121 is looped about idler sprocket wheels 122 and 123, over sprocket wheel 120 and about sprocket wheel 124 fixed on shaft 21 to rotate pick-up cylinder 12 (FIGS. 2a and 3). A protective guard 125 is disposed over the sprocket wheels. Sheave 126 is fixed to the end of shaft 58 of cylinder 55 externally of sidewall 16. A belt 127 is looped about sheaves 126, 128, 129, 130 and 131 (FIG. 3). Sheave 129 is fixed to shaft 89 which rotates stripping cylinder 88 to carry vines from in front of panel 87 into the path of fingers 60 carried by thrashing cylinder 55.

Figure 2D:
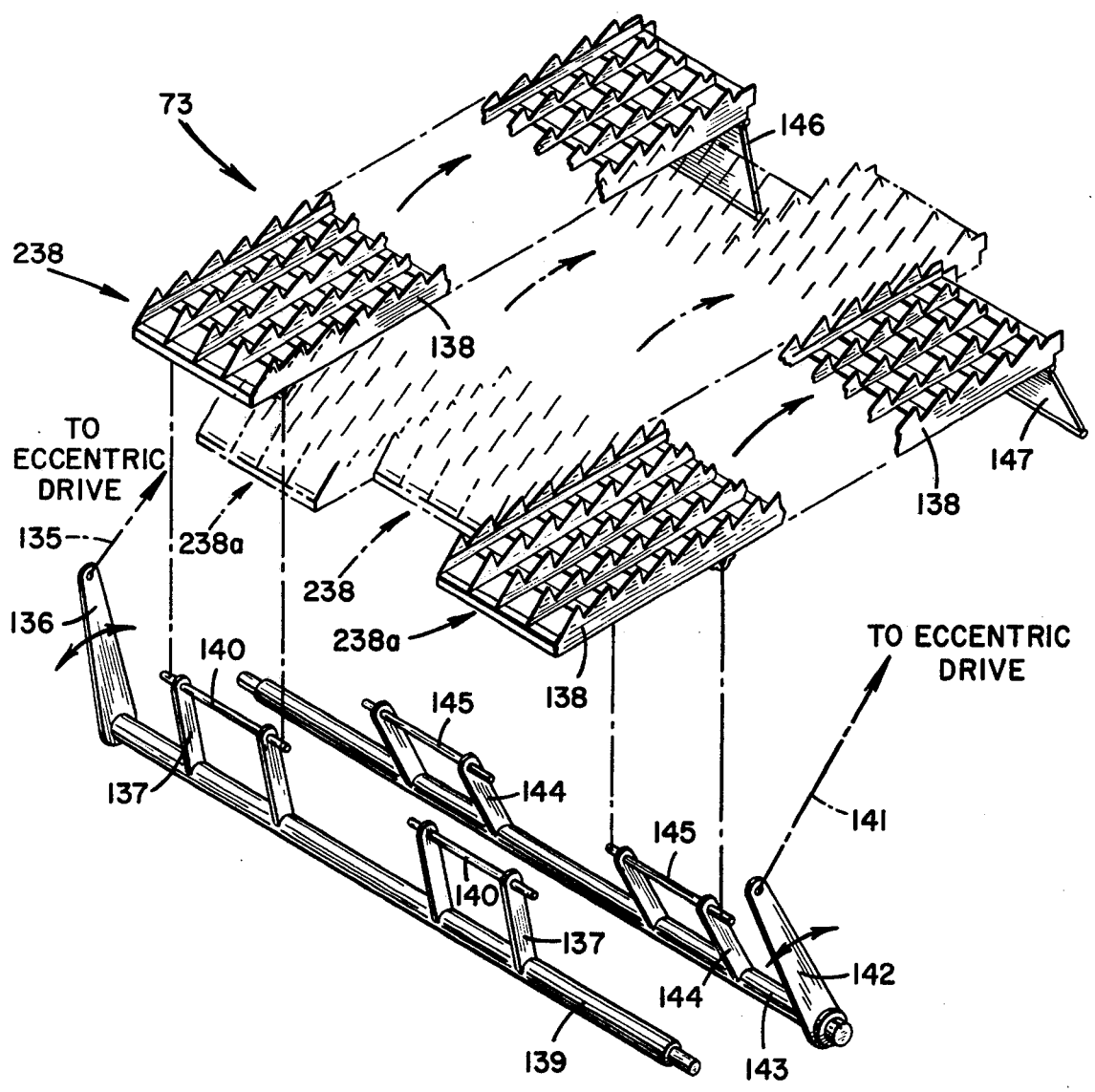
FIG. 2d is an exploded perspective view of an embodiment of a suitable straw rack.

Sheave 130 (FIG. 3) is fixed to shaft 134 which is journaled in sidewalls 16 and 17. Sheave 132 is fixed on the other end of shaft 133 adjacent to sidewall 17 (FIGS. 2a and 2b). A connecting arm 135 is pivotally fixed to sheave 130 near its peripheral edge to rotate eccentrically as sheave 130 is rotated by shaft 134. Linkage 136 is pivotally secured at one end to arm 135 and at its opposite end to a shaft 139. Straw rack 73 comprises two members 238 and two members 238a each composed of sets of six parallel spaced serrated elongated plate members 138 joined together by suitable cross-bars welded at each end to the underside thereof (FIG. 2d). Members 238 and 238a are alternately disposed across the combine. Members 238 are pivotably connected at one end to shaft 139 by a pin 140 carried by two pairs of spaced bars 137. Members 238 are pivotally connected at the rear end of the combine to pivoting supports 146. Rotation of sheave 130 causes members 238 to oscillate and move vine fragments thereon towards the rear of the combine. A similar arrangement is provided adjacent to sidewall 17 with an arm 141 fixed to sheave 132 near its periphery and pivotally connected at its other end to linkage arm 142. Linkage 142 is pivotally connected to a shaft 143. Members 238a are pivotally connected to shaft 143 by pins 145 carried by spaced pairs of bars 144. The rear end of members 238a are connected to pivoting supports 147. Rotation of sheave 132 causes members 238a to oscillate. Connecting arms 135 and 141 are fastened to sheaves 130 and 132 so that members 238 are down while members 238a are at the top of their oscillating movement.

A pulley belt 149 is looped about sheave 132 (FIG. 2b) and about sheaves 150 and 151 (FIG. 4) fixed to shafts which drive stem cutter discs 152 and 153 (FIG. 2b).

A series of screens and plates are provided below screen 35 (FIG. 2a) for transferring peanuts from screen 35 to a hopper 160 below the combine which discharges peanuts through a funnel 154 into a pneumatic conveyor 155 connected at one end to fan 107. An inclined tray 156 shaped from step-metal is disposed immediately below screen 35 and extends to a screen 157. Screen 157 is composed of a series of comb-like members each having spaced flexible wire fingers 159 secured at one end to an air vane 158 and free at the opposite end (FIGS. 2b and 2c). Each air vane 158 is secured at its ends to sidewalls 16 and 17. Air is blown through the space between fingers 159 to blow chaff from the peanuts. Fingers 159 are spaced to permit peanuts to fall therebetween. The peanuts which fall through screen 157 will fall through perforated plate 260 and to a destemmer having cutting discs 152 and 153 protruding between slats which form a grating 259 about discs 152 and 153 for supporting peanuts between the transversely spaced cutting discs. Any dust or vine fragments passing through screen 35 and sliding over plate 156 will be blown to the rear of housing 20 by straw fan 105. Those peanuts which do not fall through screen 157 move over the end of screen 157, over the end of plate 257 and are deflected by member 258 to the grating 259. The slats of grating 259 and disc cutters 152 and 153 are conventional. The cutter discs 152 and 153 are spaced in rows across the width of the combine with the grating 259 therebetween for supporting the peanuts. The transverse spacing of the cutter discs 152 and 153 is such that the peanuts roll therebetween and expose stems attached thereto to the cutting edges. The peanuts roll from discs 152 and 153 into funnel 154.

An arm 161 is pivotally fixed at one end to the hub of sprocket wheel 116 externally of sidewall 17 to follow an eccentric path as sprocket wheel 116 is rotated by shaft 58 (FIG. 4). Arm 161 is pivotally connected to linkage 162 at its opposite end. Linkage 162 is pivotally secured at its other end to one end of a linkage 163 which is pivotally connected at its opposite end to a horizontal linkage member 164. Member 164 is welded at its opposite end to the side of grate 259. A similar arrangement is provided externally of sidewall 16 (FIG. 3) with arm 165 pivotally attached to the hub of sheave 126 fixed for rotation with shaft 58. The opposite end of arm 165 is pivotally connected to linkage 166 which in turn is pivotally connected to linkage members 167 and 168 similar to members 163 and 164. Member 168 is welded to grate 259. Upon rotation of sprocket wheels 116 and 126, an eccentric motion is imparted to the linkages connected thereto which vibrates plate 156, screen 157, grate 259 and hopper 160 which causes the peanuts to flow into funnel 154.

A conventional oscillating conveyor 275 is disposed below straw rack 73. Any peanuts which fall from straw rack 73 to conveyor 275 move to the forward end and fall on screen 157. Linkage 276 is secured on end to conveyor 275 and at its opposite end to the stemmer box to move therewith.

Referring now to FIGS. 1, 11, 12, 13, 14 and 15 of the drawing, peanut combine 10 has a pneumatic conveyor designated broadly as 155 for elevating peanuts substantially free from vines as they are discharged from the combine 10 through a discharge hopper 160. A fan 107 at one end of the duct 170 is secured to sidewall 16 of housing 20 and communicates through a substantially fluid impervious joint with the duct 170 as illustrated in FIGS. 1, 13 and 15. As illustrated in FIGS. 1 and 4, duct 170 of conveyor 155 extends downwardly from fan 107, across the bottom of the combine 10 under the discharge opening in the bottom of the combine and vertically upwardly along the opposite sidewall 17 of the combine to an elevated storage bin 171 pivotally secured to the combine above the top of housing 20. The duct 170 of conveyor 155 is fixed to the housing 20 by brackets such as 172 and 173, FIG. 1. An inverted frusto-pyramidal shaped funnel member 154 has its flanged open base inserted in the opening in the bottom of hopper 160. The open apex end of funnel 154 is inserted in an opening in the duct 170. The downstream side of funnel 154 is open as shown in FIG. 13 for passage of peanuts from funnel 154.

As illustrated best in FIGS. 11 and 13, the passageway through duct 170 is partitioned into three smaller passageways 174, 175 and 176 by spaced plates 177 and 178 fixed to opposite walls of duct 170 and extending thereacross. Plate 177 is disposed immediately below the discharge end of funnel 154 when duct 170 is positioned as illustrated in FIG. 11 and extends from upstream of the open end of funnel 154 to a point downstream of the open end. Plate 178 is disposed below plate 177 starting just upstream of the downstream end of plate 177 and extending to a point downstream of the downstream end of plate 177. Plate 178 may be inclined towards the bottom wall of duct 170 or the bottom wall may be inclined upwardly towards plate 178 to provide passageway 176 with a downstream end of smaller cross-section than its upstream end. A valve 179 adapted to be pivoted into open, closed or intermediate positions to proportion the volumes of air entering passageways 174, 175 and 176 is disposed downstream of the upstream end of passageway 174 and upstream of passageways 175 and 176. Valve 179 may be actuated by handle 180 fixed to member 181 which is pivotally secured to linkage member 182. Member 182 is fixed to linkage 183 which in turn is fixed to the shaft of valve 179. A bentplate 184 fixed at one end to the top wall of duct 170 and to each of the opposite sidewalls thereof extends across duct 170 just above plate 177 to provide a restriction which will cause acceleration of the air to form an air jet which sweeps across the discharge end of funnel 154.

A plate 185 is pivotally secured in duct 170 across the space above plate 178 downstream of the downstream end of plate 177. Under ordinary operating conditions, plate 185 is in the open position illustrated by solid lines in FIG. 13. Plate 185 is bent as shown in FIG. 13 to provide a sloping surface facing towards the peanuts emerging through the opening in funnel 154. If air flow downstream of plate 185 is obstructed because of a partial blockage in the conduit downstream of plate 185, however, backpressure will cause plate 185 to swing towards the position illustrated by dotted lines in FIG. 13. Plate 185 will respond to a partial blockage and in most instances will be removed before the plate 185 moves to the position shown in the drawing. However, in some instances plate 185 will swing to the point illustrated in phantom in FIG. 13. With plate 185 in the latter position, air pressure downstream of plate 185 will increase until it is sufficiently great to move the material which is blocking duct 170 downstream until it is discharged therefrom. After the obstruction is removed, plate 185 will swing back to its open position.

Duct 170 is divided into two sections. The first section extends from fan 107 to a point alongside a wall 186 of bin 171. A second section of duct 170 has a lower end with a flange 187 which is disposed over the end of the first section but is not connected thereto. The upper end of the second section of duct 170 is secured to wall 186 (FIG. 7) which is perpendicular to bottom 188 and communicates through an opening in wall 186 with bin 171 for discharge of peanuts into the bin. Bin 171 is provided with an inclined sidewall 189 enclosing with bottom 188 an obtuse angle and having a screen 190 across its width adjacent to top wall 191. The front 192 and back 193 of bin 171 may be composed of rectangular screen sections and imperforate triangularly shaped panels 194 and 195. As will be explained later, sidewall 189 and the triangularly shaped panel sections 194 and 195 of walls 192 and 193 combine to facilitate dumping when bin 171 is pivoted to pour its contents therefrom. Top 191 of bin 171 is divided into two sections with that section adjacent to wall 186 being fixed to the walls of bin 171 and a second section adjacent to screen 190 pivotally secured to the first section. When bin 171 is pivoted about its axis, the second section of top 191 will open to permit flow of peanuts from bin 171. A duct 196 about equal in width to that of duct 170 (FIGS. 7 and 8) is secured to the inner surface of the stationary panel of top 191 terminating at one end of the pivot point of top 191 and at the other end communicating with an opening 197 in wall 186 immediately above the point where duct 170 enters bin 171. A screen 198 carried by duct 196 is disposed above the entrance of duct 170 into bin 171. A duct 199 is secured to the inner wall of the pivoting section of top 191 with one end pivotally connected to the adjacent end of duct 196 and the other open end adjacent to screen 190. A sand trap having a plate 200 extends externally alongside screen 190 in spaced relation therewith and is secured by its end walls 201 and 202 to end walls 194 and 195. Air from duct 170 will flow through screen 198 and duct 196 and carry along dirt, plant fragments and the like through screen 190 into the sand trap and then to the ground when the bin 171 is in a vertical position. When the bin 171 is pivoted for dumping, dirt passing through screen 190 is collected in the sand trap and dumped when bin 190 is returned to its upright position.

As illustrated in FIG. 1, bin 171 is pivoted about a pin 203 of a supporting frame and a corresponding pin in the supporting frame at the back of bin 171. The supporting frame is composed of base channel member 204, channel 205 fixed at one end to an end of channel 204 and at its opposite end to inclined channel 206. Channel 206 is fixed at one end to base member 204 and extends beyond the point where it is fixed to member 205 and supports pin 203. A hydraulic cylinder 207 is pivotally secured on one end to bracket 208 fixed to member 206 and at the other end to the top of bin 171. Suitable hydraulic hose is provided from the power take-off of a tractor used to tow the combine 10 to actuate cylinder 207 and pivot bin 171 as illustrated in FIG. 1 to discharge its contents. The frame structure and pivoting mechanism in FIG. 1 is duplicated at the rear of bin 171 and base member 204 is fastened to its counterpart at the rear of bin 171 by members 209 and 210 (FIGS. 3 and 4). A brace 211 extends from base member 204 to the upper end of member 206. As illustrated in FIG. 1, the two sections of duct 170 separate with the section having flanged end 187 moving with bin 171 as bin 171 is pivoted from its normal upright position.

The pneumatic conveyor provided by the invention can be used for conveying various kinds of particulate material, but as indicated hereinbefore, it is particularly advantageous for conveying peanuts to an elevated position on a peanut combine.

In operation, peanut laden vines are picked up by fingers 14 of cylinder 12 and carried to the upper surface of stripper plates 13 as the combine is towed over cut vines. As fingers 14 are withdrawn through slots 15 the vines on plates 13 slide over the surface thereof towards screen 30. Flexible spring fingers 48 carried by rotating cylinder 39 carry the vines over screens 30 and 31 and lift them to the space between the cylinders 39 and 49. Loose soil falls through the perforations in screens 30 and 31. Downwardly moving fingers 54 carried by cylinder 49 intercept the vines as they are carried upwardly by fingers 48. Since springs 54 are travelling faster than springs 48, the vines are shredded and snatched in a direction opposite from the way they were travelling. Most of the heavier peanuts are detached from the vines at this point by the whiplash action.

Vines and entrapped loose peanuts are carried by springs 54 over screen 33 with more dirt falling through the perforations in screen 33. Because the rotating speed of springs 54 is greater than that of springs 48, movement of long unshredded vines over screen 33 is substantially avoided and the mass of vines carried upwardly by fingers 48 is shredded and moved over screens 33 and 34 in a thinner layer than that carried over screens 30 and 31.

As the vines are carried upwardly from screen 34 by springs 54 they are engaged by springs 60 carried by the faster rotating cylinder 55 and again shredded by the tearing action of the oppositely travelling fingers 54 and 60. This jerking action removes most of the remaining peanuts from the short lengths of vines. The openings in screen 35 permit loose peanuts to fall therethrough as the shredded vine mass is carried by spring fingers 60 thereover. The vine mass is carried over the surface of panel 36 and pivotable load responsive plate 37.

On the first pass under picking cylinders 39, 49 and 55 some of the vines are broken to such a length that all of the peanuts may be detached therefrom. The length to which the vines must be shredded to detach all of the peanuts varies with vine size, moisture content of the vines and peanuts as well as other factors. In many instances all of the peanuts are detached in a single pass under cylinders 39, 49 and 55. However, a large percentage of the vines is carried back over the top of cylinder 55 to insure against loss of peanuts with the vine fragments discharged from the rear of the combine.

The contour of screen 35 and adjoining plates 36 and 37 is such that there is little resistance to vine flow so the vines will be easily detached from fingers 60 and will be thrown towards stripper cylinder 88 by centrifugal force. The rate of speed of cylinder 55 is such that the vines flow in a substantially straight line towards cylinder 88. Stripper cylinder 88 shreds vines being carried by fingers 60 and prevents accumulation of masses of vines in front of plate 87.

When control plate 37 lies in a plane substantially perpendicular to the underlying straw rack 73, vines will be directed thereby away from cylinder 88 and over cylinder 55. Those vines released by spring fingers 60 because of centrifugal force will be directed to the space above cylinder 88 in front of plate 169. As the vines fall from above on revolving cylinder 88 they are returned towards spring fingers 60 so only the shorter vines fall to straw rack 73.

The longer vines carried by spring fingers 60 will often have some lighter weight peanuts still attached thereto. These vines are carried by fingers 60 over the top of cylinder 55. Centrifugal force will cause the vines to strike stripper bar 86 and spring fingers 76 on bar 74. Most of the peanuts remaining on the vines are pulled off by the stripper bar 86 and fingers 76. Very few of the vine fragments carried by fingers 60 beyond stripper fingers 76 will have peanuts attached but there will be detached peanuts mixed in the shredded vine mass moving downwardly from spring fingers 76, particularly when the combine is operating at maximum capacity or when plate 37 is positioned to direct the flow of most of the vines over thrashing cylinder 55. When the mass of vines above cylinder 55 becomes excessive in volume, sensing fingers 76 will be actuated and plate 37 will be moved to its open position as described hereinbefore and a larger percentage of vine fragments will fall on straw rack 73.

Some of the vines and peanuts mixed therewith fall from fingers 60 onto fingers 54 of cylinder 49 and will be carried over the top of cylinder 49. Partitioning plate 70 directs the vines towards fingers 54. Stripper bar 69 will strip peanuts from the vines as they are carried over cylinder 49. Partitioning member 64 directs all of the vines travelling over cylinder 49 downwardly with fingers 54. The vines are intercepted by fingers 66 and again shredded as they are carried downwardly by fingers 54.

Most of the shorter vine fragments and loose peanuts are deflected away from fingers 48 by fingers 66 and will fall into the mass of vines moving from screen 31 and will be carried again by fingers 54 over screen 33. However, some of the vines will be intercepted by fingers 48 and carried over cylinder 39. The vines are intercepted and again subjected to a shredding action by spring fingers 68 disposed in the path of fingers 48.

Cylinder 39 has four flat rectangular surfaces formed by plates 44, 45, 46 and 47 extending between rimmed circular end plates 40 and 41 as shown best in FIG. 10. These flat surfaces carry most of the relatively small volume of vines which fall forwardly from fingers 54 against cylinder 39 and will not release them until after the extension of the plate has moved to beyond the position of the end of plate 47 attached to a bar 43 shown in FIG. 2a or, in other words, has moved to beyond seven o'clock as viewed in FIG. 2a. Thrashing cylinder 39 travels at a slow speed to avoid the vines being thrown therefrom by centrifugal force so most of the vines will be dumped directly on stripper plates 13 or screen 30 of vine pick-up cylinder 12 and thus not fall out of the combine.

In order to further insure that vines and peanuts carried over cylinder 39 will not fall from the combine, spring backed teeth or plates 62 are spaced across the width of the combine as shown in FIGS. 1 and 10. Any vines falling forwardly of cylinder 39 are directed by plates 62 towards screen 30. If an unusually large volume of vines is carried over cylinder 39, the spring backed plates 62 will move downwardly to permit the mass to pass as illustrated in phantom in FIG. 10.

The shredded vines are recirculated over screens 30, 31, 33, 34 and 35 with peanuts falling through screen 35. The finely shredded vines fall on straw rack 73 and are carried to the rear of the combine and discharged to the ground by the movement of the straw rack 73 described hereinbefore.

As illustrated in FIG. 10, all of the spring fingers 14, 48, 54, 60, 66 and 68 have their end portions bent to enclose an obtuse angle with the forward surface of the remainder of the finger to increase shredding of the vines.

Although straw rack 73 has been described in detail, any conventional design may be used and the thrashing system and pneumatic conveyor provided herein can be used with any conventional straw discharge apparatus. For example, the thrasher cylinders and other parts of the thrashing chamber and the pneumatic conveyor can be used with the straw removal system disclosed, for example, in U.S. Pat. Nos. 3,404,517 and 3,007,475. Moreover, although screening and de-stemming apparatus are described in detail, conventional screens and plates may be used to carry the peanuts to a conventional stemmer apparatus having rotating cutting discs. The various transfer screens, plates and de-stemmer apparatus used between screen 35 and funnel 154 may be of conventional construction and can be, for example, those disclosed in the aforesaid patents.

As explained above, the peanuts after stem removal fall through a hopper 160 into funnel 154 and are swept by the air stream at high velocity away from the funnel 154. Normally check valve 185 is in the position shown in FIG. 13 and the movement of peanuts is accelerated by the jet of air moving through passageway 175. A little further downstream a jet of air from passageway 176 is introduced into the stream of flowing peanuts. The peanuts are carried upwardly through duct 170 and are discharged into bin 171.

As illustrated in FIG. 15, most of the peanuts because of their shape do not touch plate 177 until they approach the speed of air from the jet outlets. The primary purpose of the air jet above plate 177 is to sweep the peanuts from below funnel 154 and the jet between plates 177 and 178 is primarily responsible for the acceleration and movement of the peanuts through the conveyor duct 170. Air friction above the high speed air which flows through the opening between plates 177 and 178 creates a vacuum through funnel 154 and the resulting air flow causes the trailing end of check valve 185 to raise approximately twice as high as the vertical dimension of the jet created between plates 177 and 178 under normal load conditions.

The air jet created between the downstream end of plate 177 and plate 178 is a secondary air jet which further accelerates that material not yet up to maximum speed. This jet also sustains the speed of all conveyed peanuts until they are flowing in a vertical direction. Air friction above this jet also increases air flow through funnel 154 and causes check valve 185 to raise more than if only air were flowing from the jet between plates 177 and 178.

In addition to the above, the jet emerging below the downstream end of plate 178 sweeps the lower section of curved duct 170 free of stones which will damage peanuts if allowed to collect in that area of duct 170. The peanuts travel at their greatest velocity as they settle in the jet streams but in this system they travel in a thin layer over plate 178, are cushioned somewhat by the thin layer of high speed air from the jet emerging from below plate 178 and at no point while under the influence of an air jet will they contact a firm surface at an angle which will cause impact damage. Stones which are too heavy to be accelerated to a speed which will cause them to fall into bin 171 will strike the walls of duct 170 sufficiently hard to be heard by the operator and can be removed from the conveyor 155.

By the time the peanuts have passed over the downstream end of plate 178, they have spread into a thin stream relatively far apart. The jet which strikes them at this point prevents deceleration due to friction around the bend in duct 170. After changing direction from horizontal to vertical they are carried by inertia up the vertical duct 170 until their velocity decreases below that at which the air is flowing in that section of duct 170. Air in the upper portion of the upright duct 170 which is the decelerated jet stream plus that air which was drawn through funnel 154 has a velocity great enough to insure delivery to the bin 171 but it is not sufficiently great to cause excessive impact damage to the peanuts as the peanuts strike the sides of the bin 171 or strike other peanuts already in bin 171.

If the velocity of the jet stream through duct 170 is reduced because of an abnormally heavy load of peanuts or because of some obstruction in duct 170, check valve 185 will tend to close and deflect peanuts deeper into the jet stream emerging from below the downstream end of plate 177 thus increasing their velocity at this point. If the back pressure continues to increase, however, check valve 185 will close and assume the lower position illustrated in FIG. 13 of the drawing. In this position check valve 185 will permit some air flow over the top of plate 178 but it will block entrance of peanuts into the conveyor and will eventually cause air above plate 177 to flow up through tunnel 154. The static pressure will be greatly increased within the downstream end of duct 170 and, even though volume will decrease, the additional pressure usually moves the obstruction causing the back pressure and the conveyor will return to its normal operation.

Valve 179 is used primarily when the peanuts are to be used for seed. Such peanuts are harvested at a slower rate of speed to avoid impact damage and thereby insure maximum germination. This valve may also be used to decelerate air flow when harvesting peanuts which are exceptionally dry and are therefore light in weight and have brittle hulls.

Because of the spaced acceleration of the air flowing through duct 170, the peanuts piling up in the center of bin 171 as it becomes full will be spread to the four corners of the bin by air emerging through the opening in wall 186 from duct 171. This enables one to continue harvesting peanuts until the bin is completely filled. The filled bin is pivoted as described hereinbefore to unload the peanuts and the combine is then ready to continue harvesting the crop.

Although the invention has been described in detail for the purpose of illustration it is to be understood that such detail is solely for that purpose and that those skilled in the art can make variations therein without departing from the spirit and scope of the invention except as it may be limited by the claims.

What I claim is:

1. In a peanut combine comprising a housing enclosing a space, a series of thrashing members disposed across the space for removing peanuts from peanut laden vines disposed with respect to each other whereby the vines are transferred from the first of the series to the next in the series, and means for separating the removed peanuts from the vine remnants after thrashing, the improved thrashing member which comprises a shaft disposed transversely across the space enclosed by the housing, means for rotating the shaft as the combine moves over the ground, a parallelepiped shaped member disposed about and enclosing the shaft, a circular end plate fixed to the shaft for rotation therewith and closing each end of said parallelepiped shaped member and having a diameter which is greater than the cross-section of the parallelepiped shaped member, each of the walls of the parallelepiped shaped member extending on one side only outwardly beyond the adjacent wall to the circumference of the circular plates, a bar fixed to the circumferences of the end plates and extending across the space therebetween at each point where a wall of the parallelepiped shaped member intersects the circumference of the plate member, a plurality of flexible thrashing fingers spaced along each bar, and a vine guide means disposed across the housing below the forward peripheral edge of the said improved thrashing member, said guide means comprising spring-backed plates spaced across the width of the combine and inclined downwardly in front of the improved thrashing member.

2. The combine of claim 1 having a vine pick-up cylinder disposed in front of the first thrashing member and comprising a shaft, means for rotating the shaft, a pair of square plates fixed at longitudinally spaced points to the shaft for rotation therewith, an arm fixed to each corner of each of said plates with the arms carried by one plate directly opposite the arms carried by the other plate, a bar fixed to each of the opposite arms carried by the other plate, a bar fixed to each of opposite arms carried by the two plates, spaced flexible fingers fixed to each bar, a pair of concentric circular guide means disposed eccentrically about the shaft, and a roller carried by each bar and disposed between the concentric guide means.

3. The combine of claim 2 wherein said arcuate shaped plates are secured to a screen disposed below the said first thrashing member and having perforations therein smaller than a peanut.

4. The combine of claim 3 wherein a screen having perforations therein smaller than a peanut is disposed below the second thrashing member.

5. The combine of claim 4 wherein a screen having perforations which will permit peanuts to fall therethrough is disposed below the third cylinder.

6. The combine of claim 5 having a collecting means and a pneumatic conveyor for transferring peanuts which pass through the screen below the third thrashing means to the collecting means.

7. The combine of claim 5 having a means for discharging peanuts which pass through the screen below the third thrashing means therefrom, a peanut collecting means and a means for receiving peanuts in the conduit, means for providing a first air jet in the conduit adjacent to said introducing means for providing a first air jet which sweeps thereacross, at least one additional means for providing an air jet in the conduit disposed downstream of the first jet, and means for discharging air and material from the conduit downstream of the jets into the collecting means.

8. In a combine comprising a means for lifting peanut laden vines from the ground, a series of thrashing means for separating peanuts from the ground, a series of thrashing means for separating peanuts from the vines and a screen below the last thrashing means of the series which will permit peanuts to fall therethrough and retain vine remnants remaining after thrashing, the improvement wherein a means for removing the shredded vines from the combine is disposed adjacent to the rear end of the said screen below the said last thrashing means and means for varying the volume of shredded vines moving to the said vine removing means is disposed above the removing means and adjacent to the screen below the said last thrashing means, said volume varying means comprising a shaft and a plate carried by the shaft disposed across the space above the removal means, a vine volume sensing means disposed above the said last thrashing means comprising flexible fingers spaced across the width of the said last thrashing means, said fingers being carried on a rotatable shaft, and linkage means connecting the sensing means and the volume varying means whereby the plate of the volume varying means will be pivoted with rotation of said flexible fingers of the sensing means by vines carried thereagainst by the said last thrashing means.

9. The combine of claim 8 wherein a rotatable stripping cylinder having circumferentially spaced vanes is disposed above the said vine volume varying means.

10. The combine of claim 8 wherein a partition is disposed above the space between the first and second thrashing means and space flexible fingers are carried by the partition and disposed in the path of vines carried downwardly by the said second means.

11. The combine of claim 8 comprising means for discharging peanuts which pass through the screen below the said last thrashing means, a means for collecting the peanuts and means for transporting the peanuts from the discharge point to the collecting means comprising a conduit, means for receiving peanuts into the conduit through an opening in one wall thereof and an opposite wall, means upstream of the peanut receiving means for introducing a stream of air into the conduit, a discharge end of the conduit downstream of the peanut receiving means and communicating with the collecting means, a first plate adjacent to the said receiving means extending across the conduit and extending longitudinally from upstream of the said receiving means to downstream of the receiving means, a second plate spaced between the first plate and the said opposite wall of the conduit extending across the conduit and extending longitudinally downstream from below the downstream end of the first plate whereby the velocity of the air from the supply means in increased to form air jets at longitudinally spaced points along the conduit.

12. The peanut combine of claim 11 wherein a valve for diverting air between the first plate and the material introducing means is disposed upstream of the second plate and downstream of the upstream end of the first plate.

13. The peanut combine of claim 12 wherein means is provided for reducing the volume of the space defined by the first plate upstream of the material introducing means to create an air jet which passes across the said material introducing means.

14. The peanut combine of claim 11 wherein a check valve is provided in the conduit downstream of the upstream end of the first plate and upstream of the downstream end of the second plate, said check valve comprising a plate pivotably fixed adjacent to the top of the conduit and adapted to swing with downstream flow of air through the conduit into an open position and to move towards a closed position upon obstruction of air flow and an increase in back pressure downstream thereof until said obstruction is removed.

15. The peanut combine of claim 11 wherein a valve is disposed upstream of the second plate and downstream of the upstream end of the first plate, means above the first plate to create an air jet across the said material introducing means, and a pivotable plate is provided across the conduit downstream of the upstream end of the second plate, said pivotable plate being responsive to air pressure in the conduit and adapted to be moved into an open position with unobstructed flow of air downstream thereof and towards a closed position in response to back pressure caused by obstruction of air flow downstream thereof.

16. The peanut combine of claim 11 wherein the collecting means is a bin pivotably mounted above the housing of the combine.

17. In a peanut combine having a series of thrashing cylinders and screens disposed below the thrashing cylinders comprising a screen which will permit peanuts to pass therethrough, and means for separately removing the shredded vines from the combine, the means for varying the volume of shredded vines passing to the removal means and the volume of vines carried back for further shredding comprising a plate disposed above the screen which permits peanuts to pass and above said vine removal means in the path of vines carried over said peanut passing screen, said plate being rotatably supported, a vine volume sensing means disposed above one of the thrashing cylinders, said sensing means comprising flexible fingers which project into the path of vines carried by the adjacent thrashing cylinder and adapted to be rotated by said vines as they are carried by the cylinder, means for biasing said fingers against normal flow of vines, and means for connecting the sensing volume varying means whereby said plate is rotated into position to direct vines toward the vine removal means when the flexible fingers are moved by an abnormal volume of vines above the said adjacent thrashing cylinders.

18. In a peanut combine comprising means for picking up cut peanut laden vines from the ground, means for thrashing the vines to remove the peanuts from the vines, means for separating the peanuts from the vines and discharging them separately from the combine and means for collecting the peanuts, the improved means for transporting the peanuts from the discharge point to the collecting means comprising a conduit, means for receiving peanuts into the conduit through an opening in one wall thereof and an opposite wall, means upstream of the peanut receiving means for introducing a stream of air into the conduit, a discharge end of the conduit downstream of the peanut receiving means and communicating with the collecting means, a first plate adjacent to the said receiving means extending across the conduit and extending longitudinally from upstream of the said receiving means to downstream of the receiving means, a second plate spaced between the first plate and the said opposite wall of the conduit extending across the conduit and extending longitudinally downstream from below the downstream end of the first plate whereby the velocity of the air from the supply means is increased to form air jets at longitudinally spaced points along the conduit.

19. The peanut combine of claim 18 wherein means is provided for reducing the volume of the space defined by the first plate upstream of the material introducing means to create an air jet which passes across the said material introducing means.

20. The peanut combine of claim 18 wherein the discharge end of the conduit communicates with an opening through a wall of the collecting means, the said collecting means is elevated above the means for discharging the peanuts from the combine, a duct having an open discharge end is disposed across the collecting means from above the said opening toward the opposite side of the collecting means, a screen is disposed in the duct above the opening for flow of air from the opening into the duct, said collecting means comprises a second screen adjacent the discharge end of the duct and an imperforate panel disposed back of the second screen outside of the collecting means for intercepting any solids carried by the air through the screens.

21. The peanut combine of claim 20 wherein said collecting means is a bin disposed above a housing, said bin having a top divided into first and second sections with the second section pivotally secured to the first section, said opening being adjacent to the said first section, said duct is divided into first and second sections with the second section secured to the second section of the top to pivot therewith, and said combine is provided with means for pivoting the bin to dump peanuts therefrom.

22. The peanut combine of claim 18 wherein the collecting means is a bin pivotably mounted above the housing of the combine.

23. In a combine comprising a housing enclosing thrashing means, a vine pick-up member disposed at the front of the combine adapted to lift vines from the ground and carry them into the combine to the thrashing means, said pick-up member comprising plates evenly spaced across the width of the combine having an arcuate shaped surface exposed at the front of the combine, said member being fixed to the housing, to be supported at the front of the combine near the ground, a shaft extending transversely across the said member inwardly from the spaced plates, a plurality of bars extending transversely through said member and spaced circumferentially from each other radially outwardly of the shaft, means fixed to the shaft for supporting the bars and for rotating the bars as the shaft rotates, a pair of radially spaced guide rails circular in cross-section disposed between the shaft and the said member and adjacent to each end of said bars, a roller attached to each end of said bars and disposed between the guide rails for rolling therebetween as the shaft rotates, a plurality of flexible fingers longitudinally spaced along the bars and extending through spaces between the said plates, said shaft being eccentrically disposed with respect to the center of the cross-sections of the guide rails and disposed with respect to the said member whereby the said fingers as they are moved with the shaft extend outwardly through the spaces when disposed adjacent to the ground and are retracted into the member as they rotate adjacent to said thrashing means whereby vines on the ground are picked-up and rotated about the member into the combine adjacent to the thrashing means, and means for rotating the shaft as the combine moves over the ground.

24. A combine comprising a vine pick-up member disposed adjacent the ground for transferring cut vines from the ground into the combine, said pick-up member comprising a plurality of arcuate shaped members disposed side by side with spaces therebetween to provide a curved surface over which vines are carried, and means for carrying vines from the ground over the surface into the combine comprising a shaft extending transversely through the said pick-up member inwardly of the arcuate shaped members, a square plate fixed to the shaft at each end thereof, an arm fixed to each plate at each corner thereof and extending radially outward therefrom, a bar fixed at one end to an arm of one square plate and at its opposite end to the corresponding arm of the plate at the opposite end of the shaft, a plurality of flexible fingers for moving vines over said surface spaced longitudinally along the bars and aligned with the spaces between the arcuate shaped members, a pair of guide rails spaced radially from each other and disposed eccentrically with respect to the shaft and the said arcuate shaped members, the rollers on the bars being disposed between the guide rails for rolling therebetween when the bars are rotated, whereby upon rotation of the shaft the bars follow the path provided by the guide rails and the flexible fingers extend outwardly through the spaces between the arcuate shaped members to lift vines from the ground and carry them over the surface and are withdrawn into the said pick-up member when rotated into the combine and release the vines, and means for rotating the shaft as the combine moves over the ground.

25. In a peanut combine comprising means for picking up cut peanut laden vines from the ground, means for thrashing the vines to remove the peanuts from the vines, means for separating the peanuts from the vines and discharging them separately from the combine and means for collecting the peanuts, the improved means for transporting the peanuts from the discharge point to the collecting means comprising a conduit, means for receiving peanuts into the conduit through an opening in one wall thereof and an opposite wall, means upstream of the peanut receiving means for introducing a stream of air into the conduit, a discharge end of the conduit downstream of the peanut receiving means and communicating with the collecting means, a first plate adjacent to the said receiving means extending across the conduit and extending longitudinally from upstream of the said receiving means to downstream of the receiving means, a second plate spaced between the first plate and the said opposite wall of the conduit extending across the conduit and extending longitudinally downstream from below the downstream end of the first plate, a valve for diverting air between the first plate and the material introducing means disposed upstream of the second plate and downstream of the upstream end of the first plate, whereby the velocity of the air from the said supply means is increased to form air jets at longitudinally spaced points along the conduit.

26. In a peanut combine comprising means for picking up cut peanut laden vines from the ground, means for thrashing the vines to remove the peanuts from the vines, means for separating the peanuts from the vines and discharging them separately from the combine and means for collecting the peanuts, the improved means for transporting the peanuts from the discharge point to the collecting means comprising a conduit, means for receiving peanuts into the conduit through an opening in one wall thereof and an opposite wall, means upstream of the peanut receiving means for introducing a stream of air into the conduit, a discharge end of the conduit downstream of the peanut receiving means and communicating with the collecting means, a first plate adjacent to the said receiving means extending across the conduit and extending longitudinally from upstream of the said receiving means to downstream of the recieving means, a second plate spaced between the first plate and the said opposite wall of the conduit extending across the conduit and extending longitudinally downstream from below the downstream end of the first plate whereby the velocity of the air from the said supply means is increased to form air jets at longitudinally spaced points along the conduit, a check valve disposed in the conduit downstream of the upstream end of the first plate and upstream of the downstrem end of the second plate, said check valve comprising a plate pivotably fixed adjacent to the top of the conduit and adapted to swing with downstream flow of air through the conduit into an open position and to move towards a closed position upon obstruction of air flow and an increase in back pressure downstream thereof until said obstruction is removed.

27. In a peanut combine comprising means for picking up cut peanut laden vines from the ground, means for thrashing the vines to remove the peanuts from the vines, means for separating the peanuts from the vines and discharging them separately from the combine and means for collecting the peanuts, the improved means for transporting the peanuts from the discharge point to the collecting means comprising a conduit, means for receiving peanuts into the conduit through an opening in one wall thereof and an opposite wall, means upstream of the peanut receiving means for introducing a stream of air into the conduit, a discharge end of the conduit downstream of the peanut receiving means and communicating with the collecting means, a first plate adjacent to the said receiving means extending across the conduit and extending longitudinally from upstream of the said receiving means to downstream of the receiving means, a second plate spaced between the first plate and the said opposite wall of the conduit extending across the conduit and extending longitudinally downstream from below the downstream end of the first plate, a valve disposed upstream of the second plate and downstream of the upstream end of the first plate, means above the first plate to create an air jet across the said material introducing means, and a pivotable plate disposed across the conduit downstream of the upstream end of the second plate, said pivotable plate being responsive to air pressure in the conduit and adapted to be moved into an open position with unobstructed flow of air downstream thereof and towards a closed position in response to back pressure caused by obstruction of air flow downstream thereof.

28. In a peanut combine having means for lifting peanut laden vines from the ground and means for thrashing the vines and separating the peanuts therefrom, an improved thrashing means comprising a rotatable shaft, circumferentially spaced bars spaced radially from the shaft, means secured to the shaft for rotation therewith supporting said bars, flexible fingers fastened to said bars for shredding vines, and a parallelepiped shaped vine carrying means disposed about the shaft and between the shaft and the bars, said means secured to the shaft for rotation therewith comprising a pair of circular plates spaced longitudinally on the shaft, said bars being circumferentially spaced on the peripheral edges of the plates, and the vine carrying means being a parallelpiped shaped enclosure member about the shaft disposed between the circular plates and the peripheral edges of the circular plates to prevent vines from falling through the thrashing means, said enclosure member comprising four wall members assembled with one end against each circular plate and a first edge along it length abutting the face of another wall member between the shaft and peripheral edge of the plates wherein the space within the enclosure member is parallelpiped shaped and of smaller cross-section than the diameter of the circular plates, the width of each wall member being larger than the cross-section of the said space with the second edge along the length of the said member being adjacent to one of said bars, and means for rotating the circular plates so the tops of the circular plates are rotating towards the forward end of the combine where vines falling on said wall members fall therefrom forwardly of the said thrasher.

29. In a peanut combine comprising means for picking up peanut laden vines from the ground, means for thrashing the vines to remove the peanuts from the vines, means for separating the peanuts from the vines and discharging them separately from the combine and means for collecting the peanuts, the improved means for transporting the peanuts from the discharge point to the collecting means comprising a conduit, means for receiving peanuts in the conduit, means for providing a first air jet in the conduit adjacent to said introducing means for providing a first air jet which sweeps thereacross, at least one additional means for providing an air jet in the conduit disposed downstream of the first jet, and means for discharging air and material from the conduit downstream of the jets into the collecting means.

* * * * *